US012236881B2

(12) United States Patent
Kubota

(10) Patent No.: US 12,236,881 B2
(45) Date of Patent: Feb. 25, 2025

(54) ELECTRO-OPTICAL DEVICE AND ELECTRONIC APPARATUS

(71) Applicant: SEIKO EPSON CORPORATION, Tokyo (JP)

(72) Inventor: Takehiko Kubota, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/614,047

(22) Filed: Mar. 22, 2024

(65) Prior Publication Data

US 2024/0321209 A1 Sep. 26, 2024

(30) Foreign Application Priority Data

Mar. 24, 2023 (JP) ................................ 2023-047854

(51) Int. Cl.
*G09G 3/3233* (2016.01)

(52) U.S. Cl.
CPC ....... *G09G 3/3233* (2013.01); *G09G 2310/08* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 2012/0105501 | A1 | 5/2012 | Nakamura et al. | |
| 2013/0181969 | A1 | 7/2013 | Kishi | |
| 2018/0261155 | A1 | 9/2018 | Ota | |
| 2021/0225990 | A1* | 7/2021 | Kodama ............ | H10K 59/1213 |

FOREIGN PATENT DOCUMENTS

| | | | |
|---|---|---|---|
| JP | 2010-262251 | A | 11/2010 |
| JP | 2012-098317 | A | 5/2012 |
| JP | 2018-151506 | A | 9/2018 |
| JP | 2021-179628 | A | 11/2021 |
| WO | 2012/053462 | A1 | 4/2012 |

* cited by examiner

*Primary Examiner* — Christopher J Kohlman
(74) *Attorney, Agent, or Firm* — Oliff PLC

(57) ABSTRACT

A pixel circuit includes an OLED that emits light with a luminance corresponding to a current flowing from an anode to a cathode, and a transistor that causes a current corresponding to a voltage between a gate node and a source node. The control circuit supplies a potential to the gate node via a data line in a writing period of a first frame, supplies a potential Vel for setting the transistor to be in an OFF state to the gate node via the data line in a first initialization period, and executes a reset operation in an odd-numbered row and a non-reset operation in an even-numbered row in a second initialization period. The reset operation is an operation of supplying a potential Vorst, and the non-reset operation is an operation of setting the potentials of the data line and anode to a potential between the potential Vel and Vorst.

8 Claims, 14 Drawing Sheets

ELECTRO-OPTICAL DEVICE AND ELECTRONIC APPARATUS

The present application is based on, and claims priority from JP Application Serial Number 2023-047854, filed Mar. 24, 2023, the disclosure of which is hereby incorporated by reference herein in its entirety.

BACKGROUND

1. Technical Field

The present disclosure relates to an electro-optical device and an electronic apparatus.

2. Related Art

In recent years, various types of electro-optical devices (display devices) using light emitting elements such as an organic light emitting diode (hereinafter referred to as an OLED) element have been proposed. In the electro-optical device, a configuration in which a pixel circuit including the light emitting elements and a drive transistor is provided corresponding to pixels of an image to be displayed corresponding to intersections between a scanning line and a data line is general.

In such a configuration, when a data signal having a potential corresponding to a gradation level of the pixel is supplied to a gate node of the drive transistor, the drive transistor supplies a current corresponding to a voltage between the gate node and a source node to the light emitting element. Thereby, the light emitting element emits light with luminance corresponding to the gradation level.

As the pixel circuit, a configuration that includes four transistors including a drive transistor is known (see, for example, JP-A-2021-179628).

When the electro-optical device is miniaturized and applied to a portable device, low power consumption is strongly required in relation to a battery or the like. However, the above-described configuration has a problem in that power consumption is not sufficiently reduced.

SUMMARY

In order to solve the above-described problem, an electro-optical device according to an aspect of the present disclosure

DESCRIPTION OF EMBODIMENTS

An electro-optical device according to an embodiment will be described below with reference to the accompanying drawings. In each of the drawings, dimensions and scale of each part are made different from actual ones as appropriate. Further, the embodiment described below is a suitable specific example, and various technically preferable limitations are applied, but the scope of the disclosure is not limited to these embodiments unless they are specifically described in the following description as limiting the disclosure.

Figure 1:
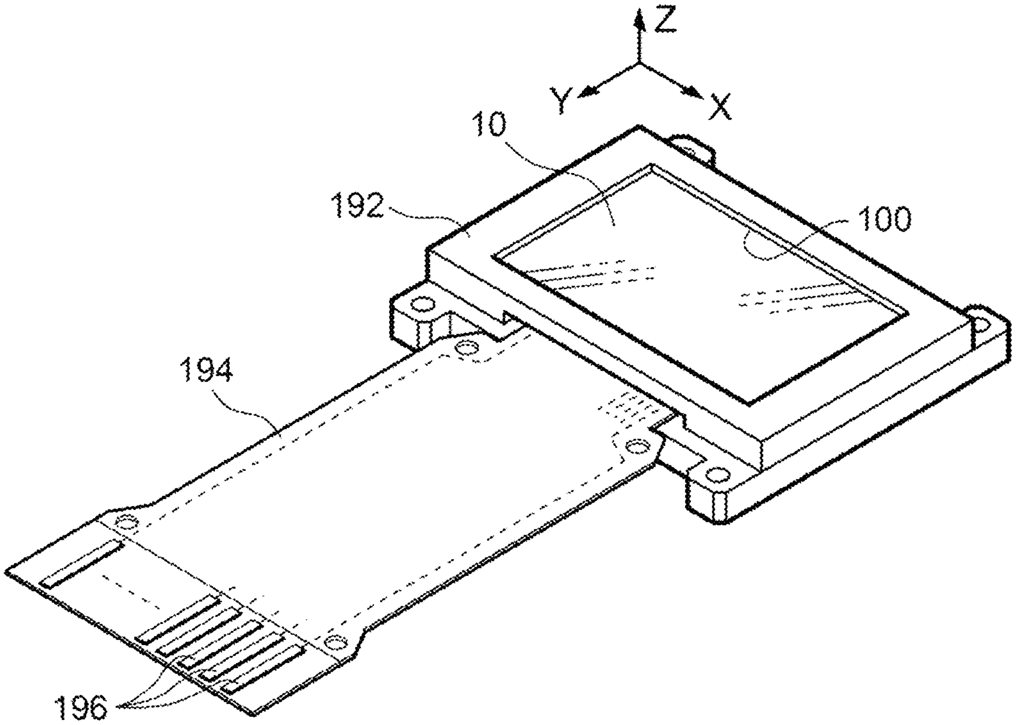
FIG. 1 is a perspective view of an electro-optical device according to an embodiment.

FIG. 1 is a perspective view illustrating an electro-optical device 10 according to an embodiment. The electro-optical device 10 is a micro display panel that displays an image, for example, in a head-mounted display or the like. The electro-optical device 10 includes a pixel circuit that includes an OLED, a drive circuit that drives the pixel circuit, and the like. The pixel circuit, the drive circuit, and the like are integrated into a semiconductor substrate. The semiconductor substrate is typically a silicon substrate, but may be a different semiconductor substrate.

The electro-optical device 10 is accommodated in a frame-shaped case 192 that opens in a display region 100. The electro-optical device 10 is coupled to one end of an FPC substrate 194. FPC is an abbreviation for flexible printed circuit. A plurality of terminals 196 that are coupled to a host device, which is not illustrated in the drawing, are provided at the other end of the FPC substrate 194. When the plurality of terminals 196 are coupled to the host device, video data, synchronization signals, and the like are supplied from the host device to the electro-optical device 10 via the FPC substrate 194.

In the drawings, an X direction is an extension direction of a scanning line in the electro-optical device 10, and a Y direction is an extension direction of a data line. A two-dimensional plane defined in the X direction and the Y direction is a substrate surface of a semiconductor substrate. A Z direction is perpendicular to the X direction and the Y direction and is an emission direction of light emitted from an OLED.

Figure 2:
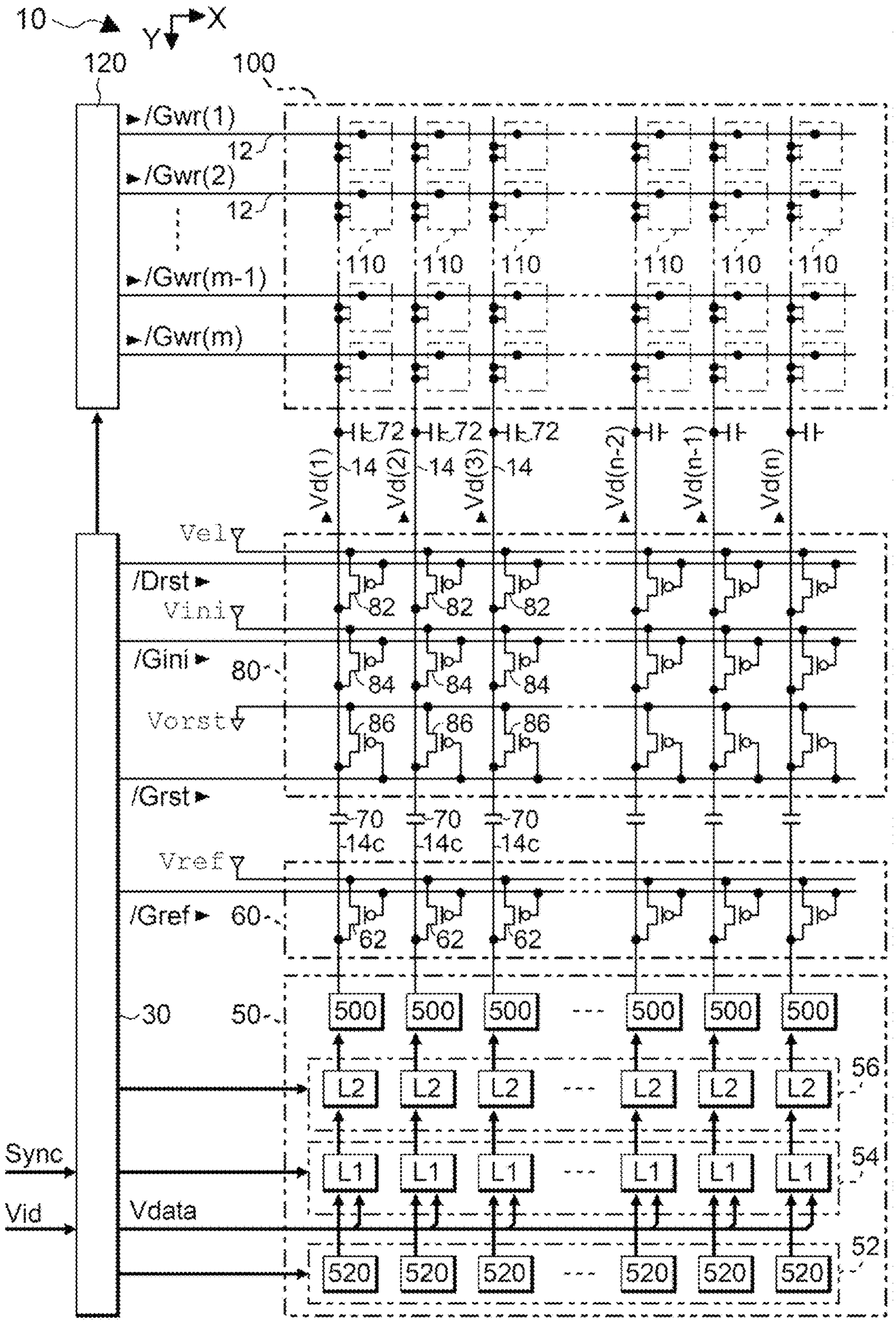
FIG. 2 is a block diagram illustrating an electrical configuration of the electro-optical device.

FIG. 2 is a block diagram illustrating an electrical configuration of the electro-optical device 10. As illustrated in the drawing, the electro-optical device 10 includes a control circuit 30, a data signal output circuit 50, an auxiliary circuit 60, n capacitive elements 70, an initialization circuit 80, a display region 100, and a scanning line drive circuit 120. In the display region 100, scanning lines 12 of m rows are provided in the X direction in the drawing, and data lines 14 of n columns are provided in the Y direction to be electrically insulated from each of the scanning lines 12. Each of m and n is an integer equal to or greater than 2.

In the display region 100, pixel circuits 110 are provided corresponding to the intersections of the scanning lines 12 of the m rows and the data lines 14 of the n columns. For this reason, the pixel circuits 110 are arranged in a matrix of m rows and n columns. In order to distinguish the rows from each other in the array of the matrix, the rows may be referred to as first, second, third, . . . , (m−1)-th, and m-th rows in order from the top in the drawing. Similarly, in order to distinguish the columns from each other in the matrix, the columns may be referred to as first, second, third, . . . , (n−1)-th, and n-th columns in order from the left in the drawing.

In order to generalize and describe the scanning lines 12, integers (i−1) and i of 1 or more and m or less are used. In particular, (i−1) may be used as an odd number to generalize and describe odd-numbered (1, 3, 5, . . . ) rows, and i may be used as an even number to generalize and describe even-numbered (2, 4, 6, . . . ) rows. In order to generalize and describe the data lines 14, an integer j of 1 or more and n or less is used.

The control circuit 30 controls each portion, based on video data Vid and a synchronization signal Sync that are supplied from the high-order host device. The video data Vid designates, for example, a gradation level of a pixel in an image to be displayed by 8 bits.

The synchronization signal Sync includes a vertical synchronization signal for giving an instruction for starting vertical scanning of the video data Vid, a horizontal synchronization signal for giving an instruction for starting horizontal scanning, and a dot clock signal that indicates a timing of one pixel of the video data.

In the embodiment, the pixels of the image to be displayed and the pixel circuits 110 in the display region 100 correspond one-to-one with each other.

A characteristic of the luminance indicated by the gradation level in the video data Vid supplied from a host device does not necessarily match a characteristic of the luminance of the OLED included in the pixel circuits 110. Consequently, in order to cause the OLED to emit light with the luminance corresponding to the gradation level designated by the video data Vid, the control circuit 30 up-converts 8 bits of the video data Vid to, for example, 10 bits in the embodiment, and outputs the video data Vdata. For this reason, the gradation level is also designated for the 10-bit video data Vdata. That is, the video data Vdata designates a gradation level obtained by converting the gradation level designated by the video data Vid.

A look-up table is used for the up-conversion, the look-up table being a table in which a correspondence relationship between the 8 bits of the video data Vid which is an input and the 10 bits of the video data Vdata which is an output is stored in advance. Further, the control circuit 30 generates various control signals to control each portion, and details thereof are described later.

The scanning line drive circuit 120 is a circuit that outputs various signals to drive the pixel circuits 110 arranged in the m rows and the n columns on a row-by-row basis under the control of the control circuit 30. For example, the scanning line drive circuit 120 sequentially supplies scanning signals /Gwr(1), /Gwr(2), . . . , /Gwr(m−1), and /Gwr(m) to the scanning lines 12 of the first, second, third, . . . , (m−1)-th, and m-th rows. In general, the scanning signal supplied to the scanning line 12 of the (i−1)-th row is denoted by /Gwr(i−1). The scanning line drive circuit 120 outputs various control signals in addition to the scanning signals /Gwr(1) to /Gwr(m), and details thereof are described later.

The data signal output circuit 50 is a circuit that outputs a voltage signal corresponding to the luminance to the pixel circuit 110 that is located in the row selected by the scanning line drive circuit 120. In detail, the data signal output circuit 50 includes a selection circuit group 52, a first latch circuit group 54, a second latch circuit group 56, and n DA conversion circuits 500.

The selection circuit group 52 includes selection circuits 520 in one-to-one correspondence with the n columns, the first latch circuit group 54 includes first latch circuits L1 in one-to-one correspondence with the n columns, and the second latch circuit group 56 includes second latch circuits L2 in one-to-one correspondence with the n columns. The n DA conversion circuits 500 correspond one-to-one to the n columns.

That is, a set of the selection circuit 520, the first latch circuit L1, the second latch circuit L2, and the DA conversion circuit 500 is provided corresponding to each column. Here, the selection circuit 520 of the j-th column instructs the first latch circuit L1 of the j-th column to select image data of the j-th column from the video data Vdata output from the control circuit 30, and the first latch circuit L1 of the j-th column latches the video data Vdata in response to the instruction. The second latch circuit L2 of the j-th column outputs the video data Vdata latched by the first latch circuit L1 of the j-th column to the DA conversion circuit 500 of the j-th column in a writing period (C) described below under the control of the control circuit 30.

The DA conversion circuit 500 of the j-th column converts the 10-bit video data Vdata output from the second latch circuit L2 of the j-th column into an analog signal, and outputs the analog signal to a data signal output line 14*c* of the j-th column. In other words, the data signal output lines 14*c* are provided in one-to-one correspondence with the data lines 14, and an output terminal of the DA conversion circuit 500 of the j-th column is coupled to the data signal output line 14*c* of the j-th column.

The auxiliary circuit 60 is an aggregate of transistors 62 provided in one-to-one correspondence with the data signal output lines 14*c*. A source node of the transistor 62 corresponding to the j-th column is coupled to a power supply line of a potential Vref, and a drain node of the transistor 62 is coupled to the data signal output line 14*c* of the j-th column. In addition, a control signal /Gref output from the control circuit 30 is supplied in common to a gate node of the transistor 62 in each column.

The n capacitive elements 70 are provided in one-to-one correspondence with the sets of the data signal output lines 14*c* and the data lines 14. In detail, one end of the capacitive element 70 of the j-th column is coupled to the data signal output line 14*c* of the j-th column, and the other end of the capacitive element 70 of the j-th column is coupled to the data line 14 of the j-th column. The video data Vdata corresponds to the gradation level designated by the video data Vid, the DA conversion circuit 500 converts the video data Vdata into an analog signal, and the analog signal is supplied to the data line 14 as a data signal via the capacitive element 70. For this reason, the potential of the data signal supplied to the data line 14 corresponds to the gradation level designated by the video data Vid and the video data Vdata.

The initialization circuit 80 is an aggregate of a set of transistors 82, 84, and 86 provided in one-to-one correspondence with the data lines 14.

A source node of the transistor 82 corresponding to the j-th column is coupled to the power supply line of a potential Vel, and a drain node of the transistor 82 is coupled to the data line 14 of the j-th column. In addition, a control signal /Drst output from the control circuit 30 is supplied in common to gate nodes of the transistors 82 in the respective columns. The potential Vel is used as a high potential of a power supply voltage.

A source node of the transistor 84 corresponding to the j-th column is coupled to the power supply line of a potential Vini, and a drain node of the transistor 84 is coupled to the data line 14 of the j-th column. In addition, a control signal /Gini output from the control circuit 30 is supplied in common to gate nodes of the transistors 84 in the respective columns.

A source node of the transistor 86 corresponding to the j-th column is coupled to the power supply line of a potential Vorst, and a drain node of the transistor 86 is coupled to the data line 14 of the j-th column. In addition, a control signal /Grst output from the control circuit 30 is supplied in common to gate nodes of the transistors 86 in the respective columns. The potential Vorst is, for example, a potential Gnd or a low potential close to the potential Gnd. Specifically, the potential Vorst is a potential at which a current does not flow through the OLED if power is supplied to the anode of the OLED.

A capacitance component is parasitic on the data line 14 in each column. In the drawing, the capacitance component is represented as a parasitic capacitance 72. That is, the parasitic capacitance 72 is electrically represented as a capacitive element in which one end is coupled to the data line 14 and the other end is coupled to a power supply line having a constant potential.

In the drawing, the potentials of the data lines 14 in the first, second, . . . , (n−1)-th, and n-th columns are denoted by Vd(1), Vd(2), . . . , Vd(n−1), and Vd(n), respectively. In general, the potential of the data line 14 of the j-th column is denoted as Vd(j).

Figure 3:
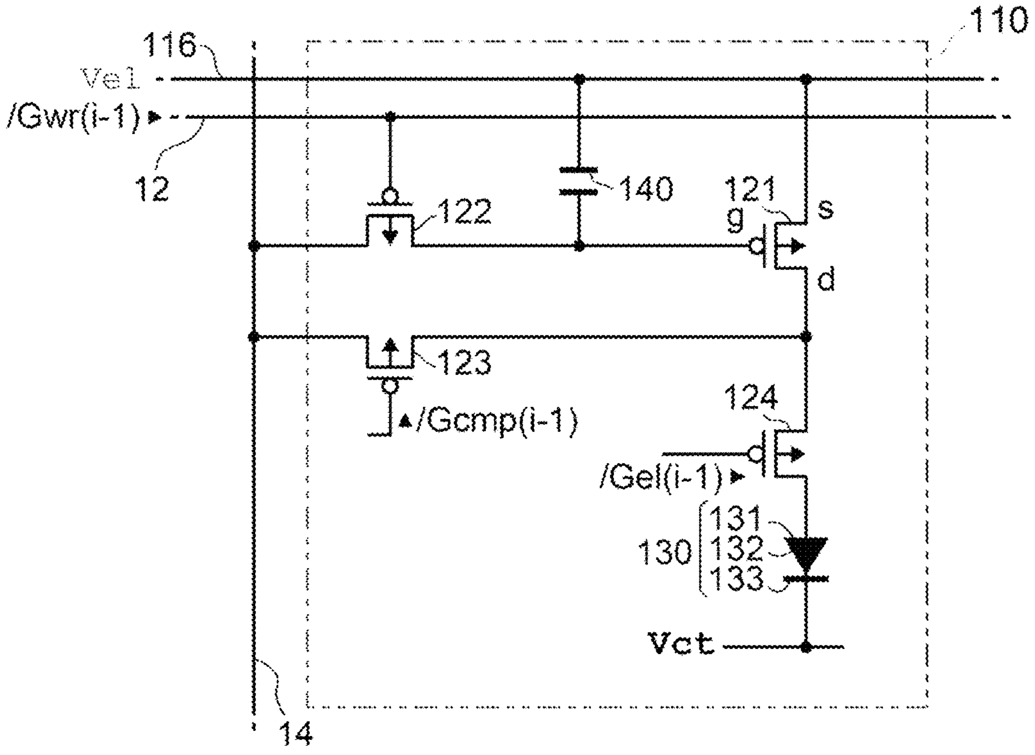
FIG. 3 is a diagram illustrating a pixel circuit of the electro-optical device.

FIG. 3 is a circuit diagram illustrating the pixel circuit 110. The pixel circuits 110 arranged in m rows and n columns are electrically identical to each other. For this reason, the pixel circuit 110 located in the (i−1)-th row and the j-th column is described as a representative of the pixel circuits 110.

As illustrated in the drawing, the pixel circuit 110 includes an OLED 130, p-type transistors 121 to 124, and a capacitive element 140. The transistors 121 to 124 are, for example, MOS transistors. MOS is an abbreviation for metal-oxide-semiconductor field-effect transistor.

Further, in addition to a scanning signal /Gwr(i−1) corresponding to the (i−1)-th row, control signals /Gel(i−1) and /Gcmp(i−1) are supplied from the scanning line drive circuit 120 to the pixel circuit 110 of the (i−1)-th row.

The control signal /Gel(i−1) is a generalized representation of the control signals /Gel(1), /Gel(2), . . . , /Gel(m−1), and /Gel(m) sequentially supplied corresponding to the first, second, . . . , (m−1)-th, and m-th rows. Similarly, the control signal /Gcmp(i−1) is a generalized representation of the control signals /Gcmp (1), /Gcmp (2), . . . , /Gcmp (m−1), and /Gcmp (m) sequentially supplied corresponding to the first, second, . . . 1, (m−1)-th, and m-th rows.

The OLED 130 is a light emitting element in which a light emitting functional layer 132 is sandwiched between a pixel electrode 131 and a common electrode 133. The pixel electrode 131 functions as an anode, and the common electrode 133 serves as a cathode. The common electrode 133 is light-transmissive.

In the OLED 130, when a current flows from the anode to the cathode, holes injected from the anode and electrons injected from the cathode recombine in the light emitting functional layer 132 to generate excitons, and white color light is generated.

In the case of color display, the generated white light resonates in an optical resonator constituted by, for example, a reflective layer and a semi-reflective and semi-transmissive layer which are not illustrated in the drawing, and is emitted with a resonance wavelength set corresponding to any one color of red (R), green (G), and blue (B). A color filter corresponding to the color is provided on the emission side of the light emitted from the optical resonator. Thus, the light emitted from the OLED 130 is sequentially colored by the optical resonator and the color filter and is visually recognized by the observer. The optical resonator is not illustrated in the drawing. In addition, when the electro-optical device 10 simply displays a monochrome image having only the luminance and darkness, the optical resonator and the color filter are omitted.

In the transistor 121 of the pixel circuit 110 of the (i−1)-th row and the j-th column, a gate node g is coupled to the drain node of the transistor 122, a source node s is coupled to the power supply line 116 to which the potential Vel is supplied, and a drain node d is coupled to the source node of the transistor 123 and the source node of the transistor 124. In the capacitive element 140, one end is coupled to the gate node g of the transistor 121, and the other end is coupled to the power supply line 116. For this reason, the capacitive element 140 holds a voltage between the gate node g and the source node s in the transistor 121.

The other end of the capacitive element 140 is coupled to a power supply line with a potential other than the power supply line 116 with the potential Vel as long as the potential is maintained substantially constant.

In the embodiment, for example, a so-called MOS capacitor which is formed by interposing a gate insulating layer of a transistor between a semiconductor layer (lower electrode) and a gate electrode layer (upper electrode) of the transistor is used as the capacitive element 140. As the capacitive element 140, a parasitic capacitance of the gate node g of the transistor 121 may be used, or a so-called metal capacitance formed by interposing an insulating layer between conductive layers different from each other in the semiconductor substrate may be used.

In the transistor 122 of the pixel circuit 110 of the(i−1)-th row and the j-th column, the gate node is coupled to the scanning line 12 of the (i−1)-th row, and the source node is coupled to the data line 14 of the j-th column. In the transistor 123 of the pixel circuit 110 of the (i−1)-th row and the j-th column, the control signal /Gcmp (i−1) is supplied to the gate node, and the drain node is coupled to the data line 14 of the j-th column. In the transistor 124 of the pixel circuit 110 of the (i−1)-th row and the j-th column, the control signal /Gel(i−1) is supplied to the gate node, and the drain node is coupled to the pixel electrode 131 which is the anode of the OLED 130.

A potential Vct is supplied to the common electrode 133 serving as the cathode of the OLED 130. The potential Vct is, for example, the potential Gnd or a low potential close to the potential Gnd.

In the present description, "electrically coupled" or simply "coupled" means direct or indirect coupling or coupling between two or more elements, and includes, for example, coupling between two or more elements via different wiring layers and contact holes even when the two or more elements are not directly coupled in a semiconductor substrate.

The control circuit 30 controls driving of the pixel circuit 110 via the data signal output circuit 50, the auxiliary circuit 60, the initialization circuit 80, and the scanning line drive circuit 120. For this reason, the control circuit 30, the data signal output circuit 50, the auxiliary circuit 60, the initialization circuit 80, and the scanning line drive circuit 120 may be collectively referred to as a control circuit in a broad sense that controls the pixel circuit 110.

Next, an operation of the electro-optical device 10 will be described.

Figure 4:
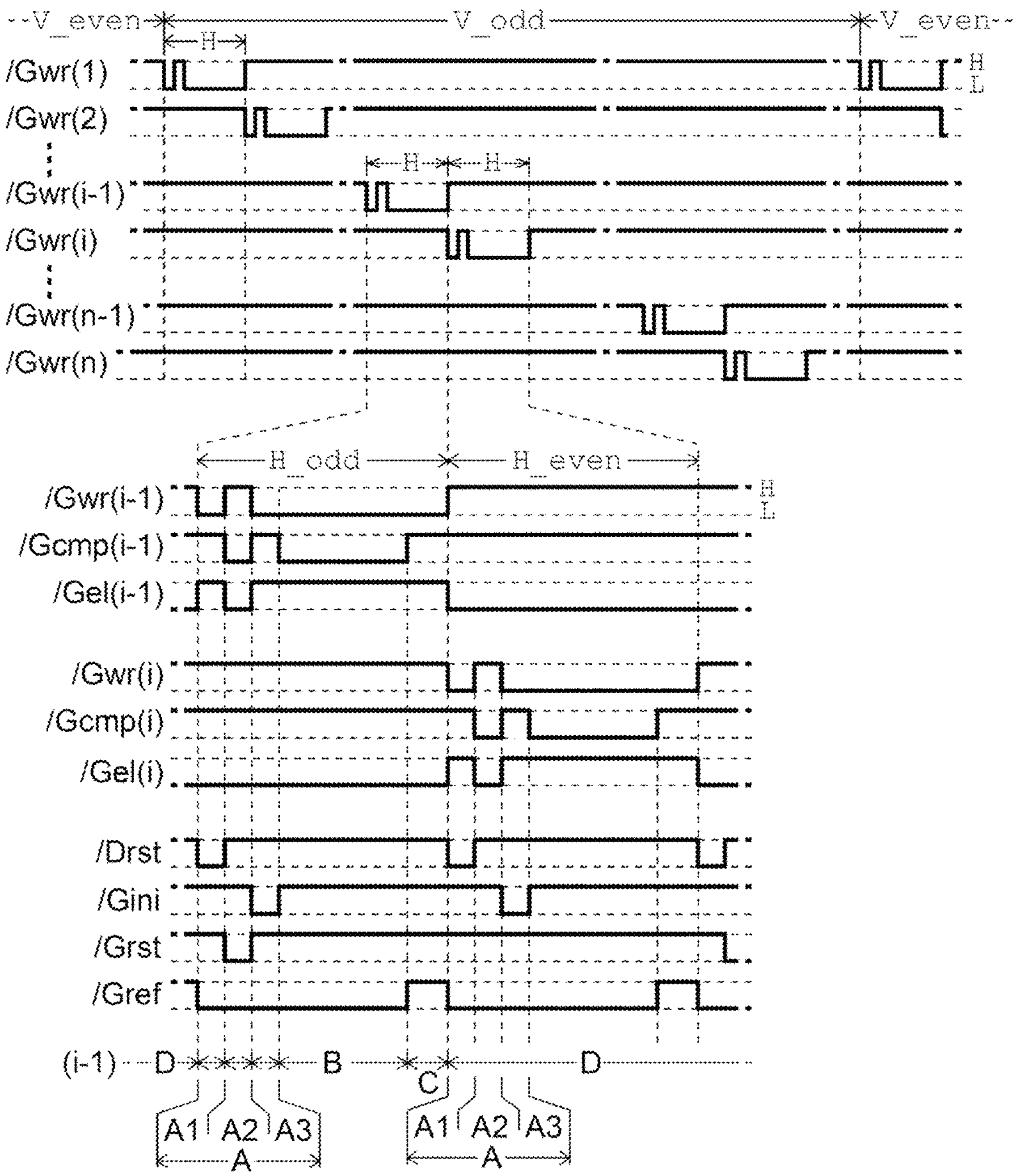
FIG. 4 is a timing chart illustrating an operation of the electro-optical device.
Figure 5:
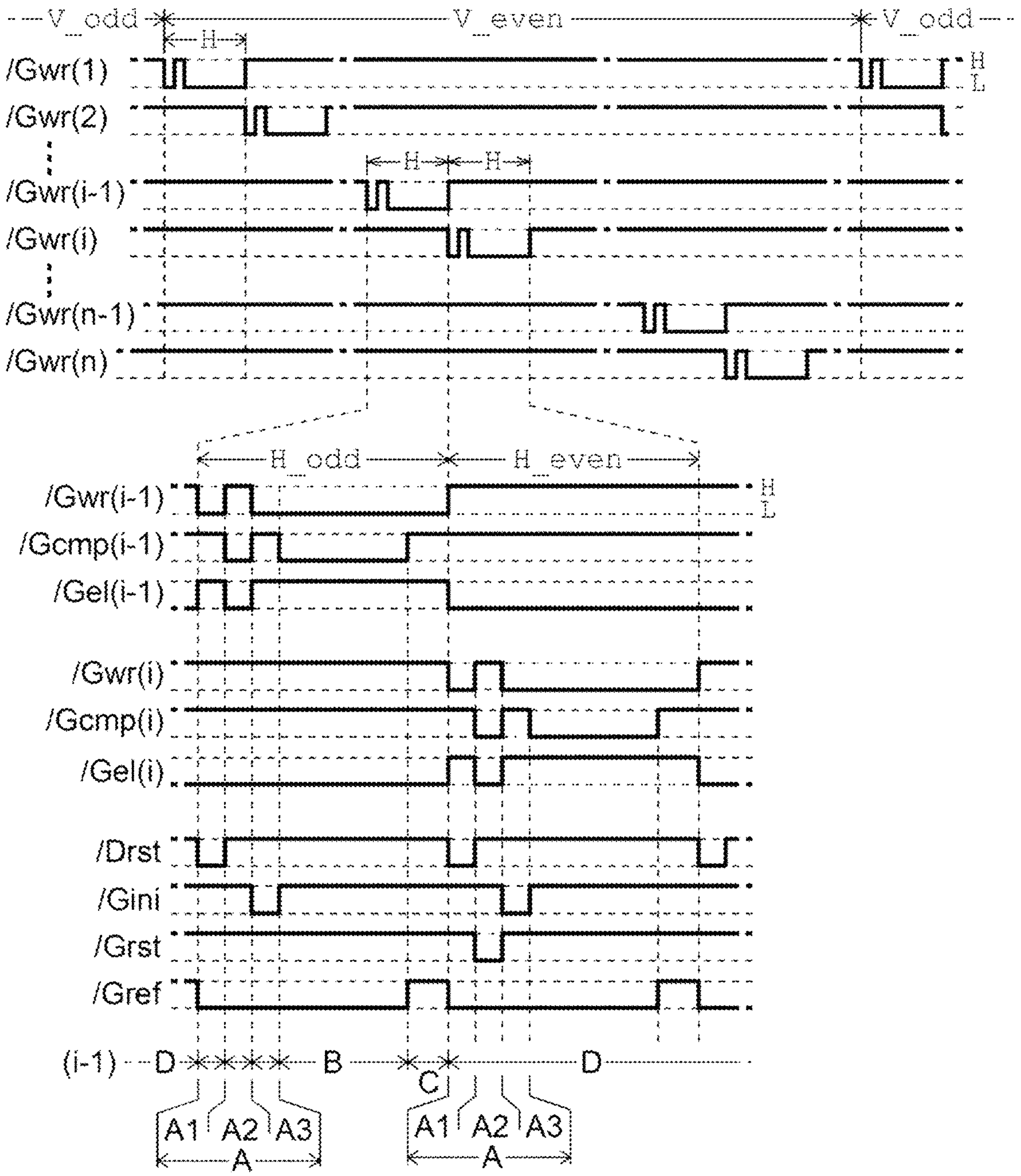
FIG. 5 is a timing chart illustrating an operation of the electro-optical device.

FIGS. 4 and 5 are timing charts for describing an operation of the electro-optical device. Of these, FIG. 4 is a timing chart of an odd-numbered frame (V_odd), and FIG. 5 is a timing chart of an even-numbered frame (V_even).

In the present description, the odd-numbered frame (V_odd) refers to one temporally preceding frame of two consecutive frames, and the even-numbered frame (V_even) refers to one temporally succeeding frame of the two consecutive frames. One frame is a period required to display one frame of an image designated by the video data Vid. When the temporal duration of one frame is the same as the vertical synchronization period, for example, when the frequency of the vertical synchronization signal included in the synchronization signal Sync is 60 Hz, the temporal duration of one frame is 16.7 milliseconds, which corresponds to one period of the vertical synchronization signal.

In the electro-optical device 10, the scanning lines 12 of m rows are selected row by row in the order of the first, second, third, . . . , and m-th rows and are horizontally scanned in each of the odd-numbered frame (V_odd) and the even-numbered frame (V_even). A period required for horizontal scanning of one row is a horizontal scanning period (H).

In the electro-optical device 10, the horizontal scanning period (H) is divided into an initialization period (A), a compensation period (B), and a writing period (C) in order of time. Among these, the initialization period (A) is further divided into three initialization periods (A1), (A2) and (A3). As the operation of the pixel circuit 110, a light emission period (D) is further added in addition to the initialization period (A), the compensation period (B), and the writing period (C).

The initialization period (A1) is a period for setting the transistor 121 to be in an OFF state. The initialization period (A2) is a period in which the anode potential in the OLED 130 is reset for one of the odd-numbered row and the even-numbered row. In the initialization period (A2), the anode potential in the OLED 130 is not reset in the other of the odd-numbered row and the even-numbered row.

The initialization period (A3) is a period for supplying, to the gate node g, the potential Vini for setting the transistor 121 to be in an ON state.

The compensation period (B) is a period for converging the potential of the gate node g of the transistor 121 to a potential corresponding to a threshold voltage of the transistor 121.

The writing period (C) is a period in which the potential corresponding to the gradation level is held (written) in the gate node g of the transistor 121, and in detail, is a period for changing the gate node g of the transistor 121 from the potential corresponding to the threshold voltage by a voltage corresponding to a current flowing through the OLED 130. The light emission period (D) is a period for causing a current corresponding to the potential of the gate node g held in the writing period (C) to flow through the OLED 130 to emit light.

As described above, in the embodiment, frames are divided into odd frames (V_odd) and even frames (V_even).

In addition, the operation of the horizontal scanning period (H) in each row is the same except that it differs between odd-numbered rows and even-numbered rows in the initialization period (A2), and the operations of the pixel circuits 110 of the first to n-th columns scanned in the horizontal scanning period (H) are substantially the same.

Consequently, hereinafter, the operation of an odd-numbered frame (V_odd) will be described first, and then the operation of an even-numbered frame (V_even) will be described. In each frame, the operation of the pixel circuit 110 in the (i−1)-th row and the j-th column in a horizontal scanning period (H_odd) of the odd-numbered (i−1)-th row is described first, and then the operation of the pixel circuit 110 in the i-th row and the j-th column in a horizontal scanning period (H_even) of the even-numbered i-th row is described.

In the initialization period (A1) of each horizontal scanning period (H) of the odd-numbered frame (V_odd), the control signal /Drst is at an L level, the control signal /Gini is at an H level, and the control signal /Gref is at an L level. For this reason, the transistor 82 in each column is set to be in an ON state, the transistor 84 in each column is set to be in an OFF state, and the transistor 62 in each column is set to be in an ON state.

Further, in the initialization period (A1) of the horizontal scanning period (H_odd) of the odd-numbered (i−1)-th row in the odd-numbered frame (V_odd), the control signal /Grst is at an H level. For this reason, the transistor 86 in each column is set to be in an OFF state.

Further, in the initialization period (A1) of the horizontal scanning period (H_odd) in the odd-numbered (i−1)-th row, the scanning signal /Gwr(i−1) is at an L level, the control signal /Gcmp (i−1) is at an H level, and the control signal /Gel(i−1) is at an H level. For this reason, in the initialization period (A1), in the pixel circuit 110 of the (i−1)-th row and the j-th column, the transistor 122 is in an ON state, the transistor 123 is in an OFF state, and the transistor 124 is in an OFF state. The initialization period (A1) of the horizontal scanning period (H_odd) corresponds to a "first gate node initialization period" in the claims.

Figure 6:
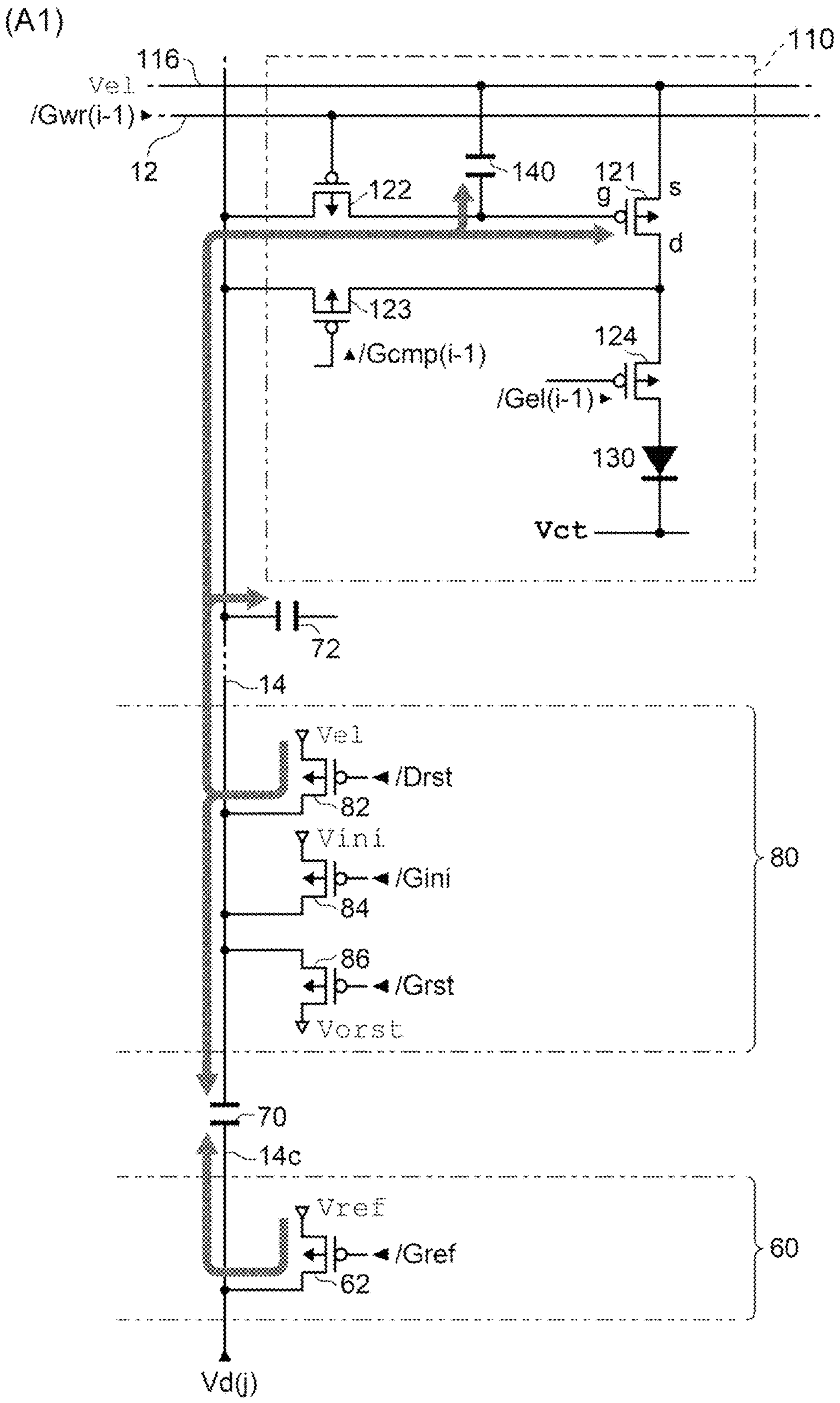
FIG. 6 is a diagram illustrating an operation of the electro-optical device.

Thus, in the initialization period (A1), as illustrated in FIG. 6, in the pixel circuit 110 of the (i−1)-th row and the j-th column, the potential Vel is supplied to one end of the capacitive element 140 and the gate node g of the transistor 121 via the transistor 82, the data line 14 of the j-th column, and the transistor 122 in that order. When the gate node g is set to a potential Vel, a voltage between the gate node g and the source node s becomes zero, and thus the transistor 121 is forcibly set to be in an OFF state.

In the present embodiment, the transistor 121 is set to an OFF state in the initialization period (A1), but the present disclosure is not limited thereto, and the initialization period (A1) may not be provided. That is, the anode potential of the OLED 130 may be reset in the initialization period (A2) without setting the transistor 121 to be in an OFF state in the initialization period (A1). Alternatively, the transistor 122 may be set to be in an OFF state to reset the anode potential in the OLED 130.

In the initialization period (A1) of the horizontal scanning period (H_odd) of the odd-numbered (i−1)-th row in the odd-numbered frame (V_odd), the transistor 82 in each column is set to be in an ON state, and the transistor 62 in each column is set to be in an ON state. For this reason, in the initialization period (A1) of the horizontal scanning period (H_odd), in each column, the data line 14 is set to a potential Vel, and the data signal output line 14*c* is set to a potential Vref.

Thus, in each column, a voltage between both ends of the capacitive element 70 is set to |Vel−Vref|, and one end of the parasitic capacitance 72 is held at the potential Vel. Since the potential Vel is at a high level of the power supply voltage, the capacitive element 70 and the parasitic capacitance 72 in each column are charged.

In the initialization period (A2) of each horizontal scanning period (H) in the odd-numbered frame (V_odd), the control signal /Drst changes to an H level, the control signal /Gini is maintained at an H level, and the control signal /Gref is maintained at an L level. For this reason, the transistor 82 in each column changes to an OFF state, the transistor 84 in each column is maintained in an OFF state, and the transistor 62 in each column is maintained in an ON state.

Further, in the initialization period (A2) of the horizontal scanning period (H_odd) of the odd-numbered (i−1)-th row, the control signal /Grst changes to the L level. For this reason, the transistor 86 in each column changes to an ON state.

In the initialization period (A2) of the horizontal scanning period (H_odd) of the odd-numbered (i−1)-th row, the scanning signal /Gwr(i−1) changes to an H level, the control signal /Gcmp(i−1) changes to an L level, and the control signal /Gel(i−1) changes to an L level. For this reason, in the initialization period (A2), in the pixel circuit 110 of the (i−1)-th row and the j-th column, the transistor 122 changes to an OFF state, the transistor 123 changes to an ON state, and the transistor 124 changes to an ON state.

Figure 7:
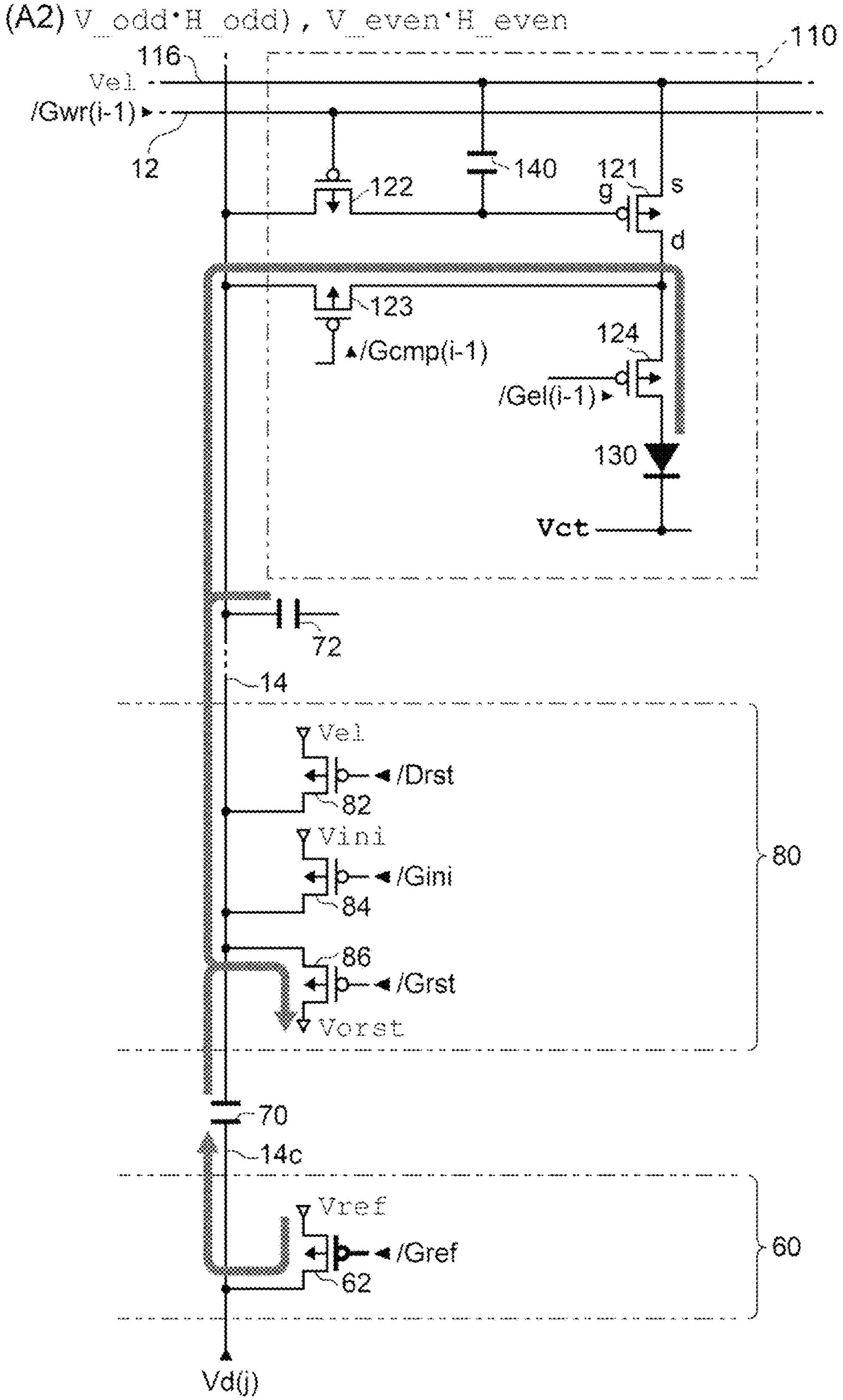
FIG. 7 is a diagram illustrating an operation of the electro-optical device.

For this reason, in the initialization period (A2), as illustrated in FIG. 7, an operation in which the anode of the OLED 130 in the pixel circuit 110 of the (i−1)-th row and the j-th column is reset to a potential Vorst via the transistors 124 and 123, the data line 14 of the j-th column, and the transistor 86 in order (reset operation), that is, a reset operation, is performed. The initialization period (A2) of the horizontal scanning period (H_odd) corresponds to a "first initialization period" in the claims, and the reset operation corresponds to a "first operation" in the claims.

In the initialization period (A2) of the horizontal scanning period (H_odd) of the odd-numbered (i−1)-th row in the odd-numbered frame (V_odd), the transistor 86 in each column is in an ON state, and the transistor 62 in each column is maintained in an ON state. For this reason, in the initialization period (A2) of the horizontal scanning period (H_odd), in each column, the data line 14 is set to the potential Vorst, and the data signal output line 14*c* is maintained at the potential Vref continuously from the initialization period (A1).

Thus, in each column, a voltage between both ends of the capacitive element 70 is set to | Vorst-Vref|, and one end of the parasitic capacitance 72 is held at the potential Vorst. The potentials Vel and Vorst have a relationship satisfying Vel>Vorst, and thus the capacitive element 70 and the parasitic capacitance 72 in the j-th column are discharged.

In the initialization period (A3) of each horizontal scanning period (H) of each odd-numbered frame (V_odd), the control signal /Drst is maintained at an H level, the control signal /Gini changes to an L level, and the control signal /Gref is maintained at an L level. For this reason, the transistor 82 in each column is maintained in an OFF state, the transistor 84 in each column changes to an ON state, and the transistor 62 in each column is maintained in an ON state.

Further, in the initialization period (A3) of the horizontal scanning period (H_odd) of the odd-numbered (i−1) th row, the control signal /Grst changes to an H level. For this reason, the transistor 86 in each column changes to an OFF state. The initialization period (A3) of the horizontal scanning period (H_odd) corresponds to a "third initialization period" in the claims.

In the initialization period (A3) of the horizontal scanning period (H_odd) of the odd-numbered (i−1)-th row, the scanning signal /Gwr(i−1) changes to an L level, the control signal /Gcmp(i−1) changes to an H level, and the control signal /Gel(i−1) changes to an H level. For this reason, in the initialization period (A3), in the pixel circuit 110 of the (i−1)-th row and the j-th column, the transistor 122 changes to an ON state, the transistor 123 changes to an OFF state, and the transistor 124 changes to an OFF state.

Figure 9:
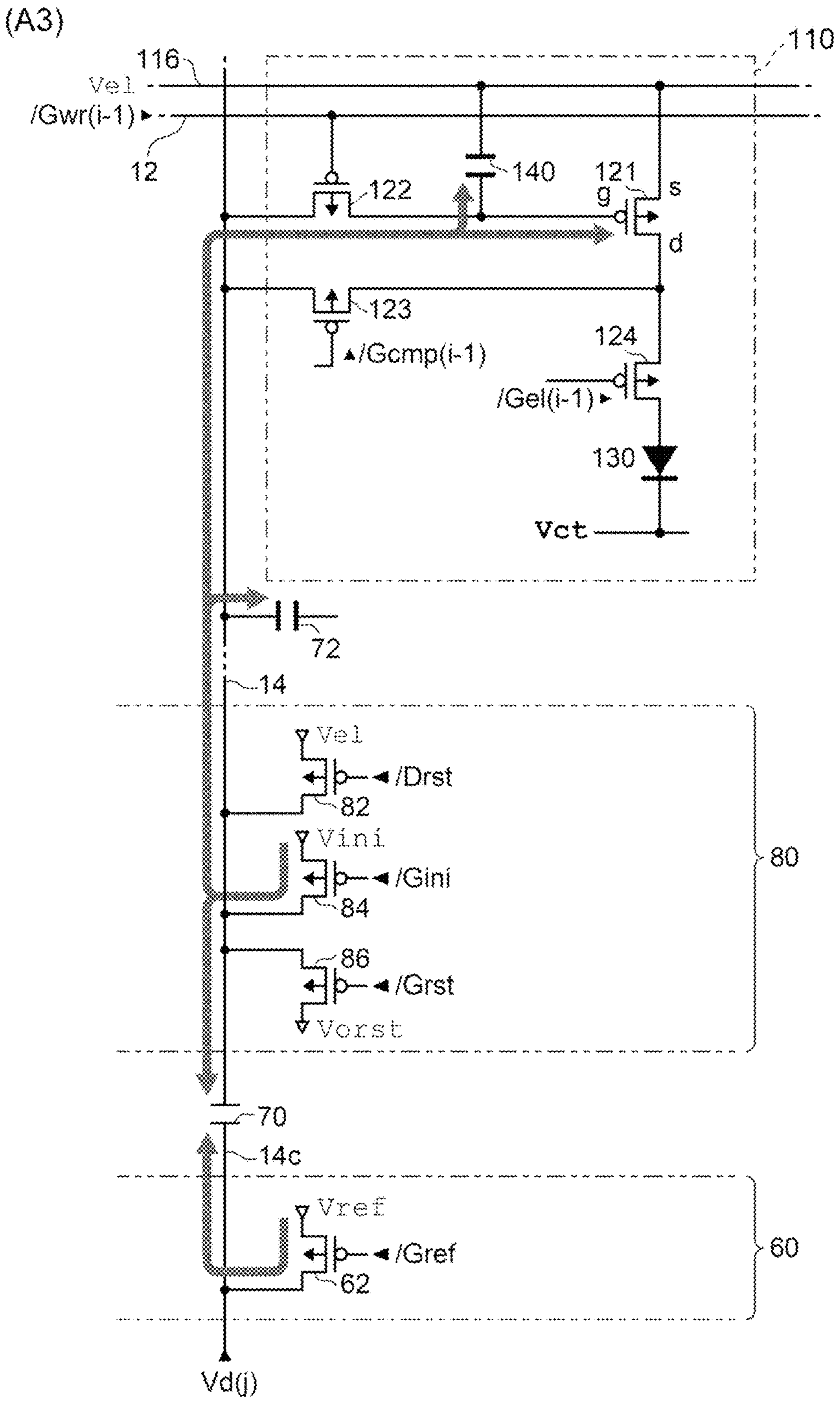
FIG. 9 is a diagram illustrating an operation of the electro-optical device.

Thus, in the initialization period (A3), as illustrated in FIG. 9, in the pixel circuit 110 of the (i−1)-th row and the j-th column, the potential Vini is supplied to one end of the capacitive element 140 and the gate node g of the transistor 121 via the transistor 84, the data line 14 of the j-th column, and the transistor 122 in order.

In the initialization period (A3) of the horizontal scanning period (H_odd) of the odd-numbered (i−1)-th row in the odd-numbered frame (V_odd), the transistor 84 in each column is in an ON state, and the transistor 62 in each column is maintained in an ON state. For this reason, in the initialization period (A3) of the horizontal scanning period (H_odd), in each column, the data line 14 is set to the potential Vini, and the data signal output line 14*c* is maintained at the potential Vref continuously from the initialization period (A1).

Thus, in each column, a voltage between both ends of the capacitive element 70 is set to |Vini−Vref|, and one end of the parasitic capacitance 72 is held at the potential Vini. The potentials Vini and Vorst have a relationship satisfying (Vel>) Vini>Vorst.

For this reason, the capacitive element 70 and the parasitic capacitance 72 are charged.

In the compensation period (B) of each horizontal scanning period (H) of each odd-numbered frame (V_odd), the control signal /Drst is maintained at an H level, the control signal /Gini changes to an H level, and the control signal /Gref is maintained at an L level. For this reason, the transistor 82 in each column is maintained in an OFF state, the transistor 84 in each column changes to an OFF state, and the transistor 62 in each column is maintained in an ON state.

Further, in the compensation period (B) of the horizontal scanning period (H_odd) of the odd-numbered (i−1)-th row, the control signal /Grst is maintained at an H level. For this reason, the transistor 86 in each column is maintained in an OFF state.

Further, in the compensation period (B) of the horizontal scanning period (H_odd) of the odd-numbered (i−1)-th row, the scanning signal /Gwr(i−1) is maintained at an L level, the control signal /Gcmp(i−1) changes to an L level, and the control signal /Gel(i−1) is maintained at an H level. For this reason, in the pixel circuit 110 of the (i−1)-th row and the j-th column, the transistor 122 is maintained in an ON state, the transistor 123 changes to an ON state, and the transistor 124 is maintained in an OFF state.

At the start of the compensation period (B), in the pixel circuit 110 of the (i−1)-th row, the gate node g of the transistor 121 is set to the potential Vini. When the transistor 123 is set to be in an ON state in a case where the gate node g is set to the potential Vini, the transistor 121 is diode-coupled.

Figure 10:
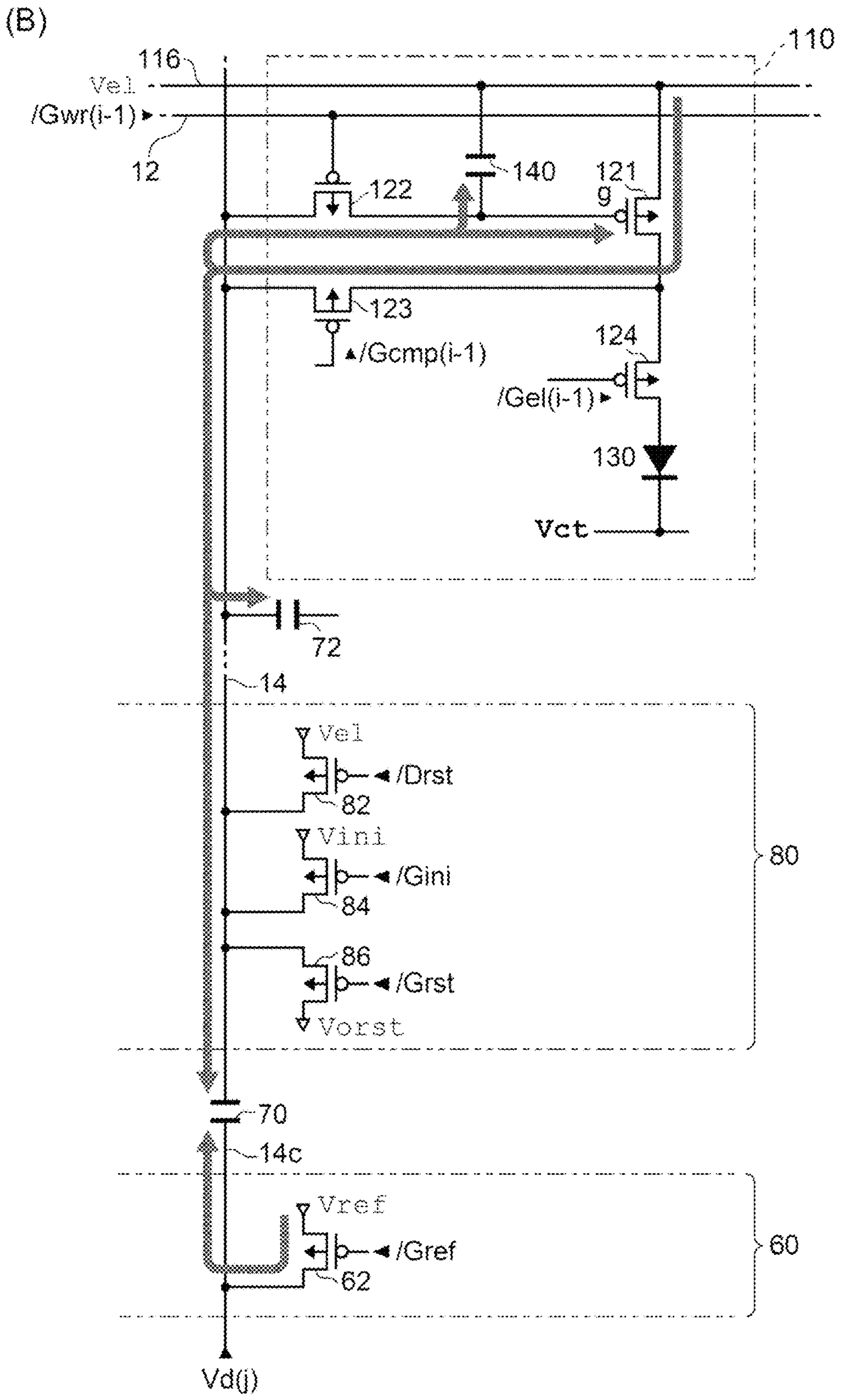
FIG. 10 is a diagram illustrating an operation of the electro-optical device.

Thus, as illustrated in FIG. 10, in the compensation period (B), a voltage between the gate node g and the source node s in the transistor 121 converges on (a voltage close to) a threshold voltage Vth of the transistor 121. That is, the potentials of the gate node g in the transistor 121 and the data line 14 converges on a threshold equivalent potential (Vel-Vth).

In the compensation period (B) of the (i−1)-th row, the transistor 62 in each column is maintained in an ON state, and thus the data signal output line 14c in each column is maintained at the potential Vref.

Since the data line 14 converges on the threshold equivalent potential (Vel-Vth), a voltage between both ends of the capacitive element 70 is set to | Vel-Vth-Vref|, and one end of the parasitic capacitance 72 is held at the threshold equivalent potential (Vel-Vth).

In the writing period (C) of each horizontal scanning period (H) of the odd-numbered frame (V_odd), the control signal /Drst is maintained at an H level, the control signal /Gini is maintained at an H level, and the control signal /Gref changes to an H level. For this reason, the transistor 82 in each column is maintained in an OFF state, the transistor 84 in each column is maintained in an OFF state, and the transistor 62 in each column changes to an OFF state.

Further, in the writing period (C) of the horizontal scanning period (H_odd) of the odd-numbered (i−1)-th row in the odd-numbered frame (V_odd), the control signal /Grst is maintained at an H level. For this reason, the transistor 86 in each column is maintained in an OFF state.

In the writing period (C) of the horizontal scanning period (H_odd) of the (i−1)-th row, the scanning signal /Gwr(i−1) is maintained at an L level, the control signal /Gcmp (i−1) changes to an H level, and the control signal /Gel(i−1) is maintained at an H level. For this reason, in the pixel circuit 110 of the (i−1)-th row and the j-th column, the transistor 122 is maintained in an ON state, the transistor 123 changes to an OFF state, and the transistor 124 is maintained in an OFF state.

In the writing period (C), the transistor 62 in each column changes to an OFF state. Further, the 10-bit video data Vdata corresponding to the (i−1)-th row and column is supplied to the DA conversion circuit 500 in each column. For this reason, the DA conversion circuit 500 of the j-th column outputs a signal having a potential corresponding to the gradation level of the (i−1)-th row and the j-th column to the data signal output line 14c.

Figure 11:
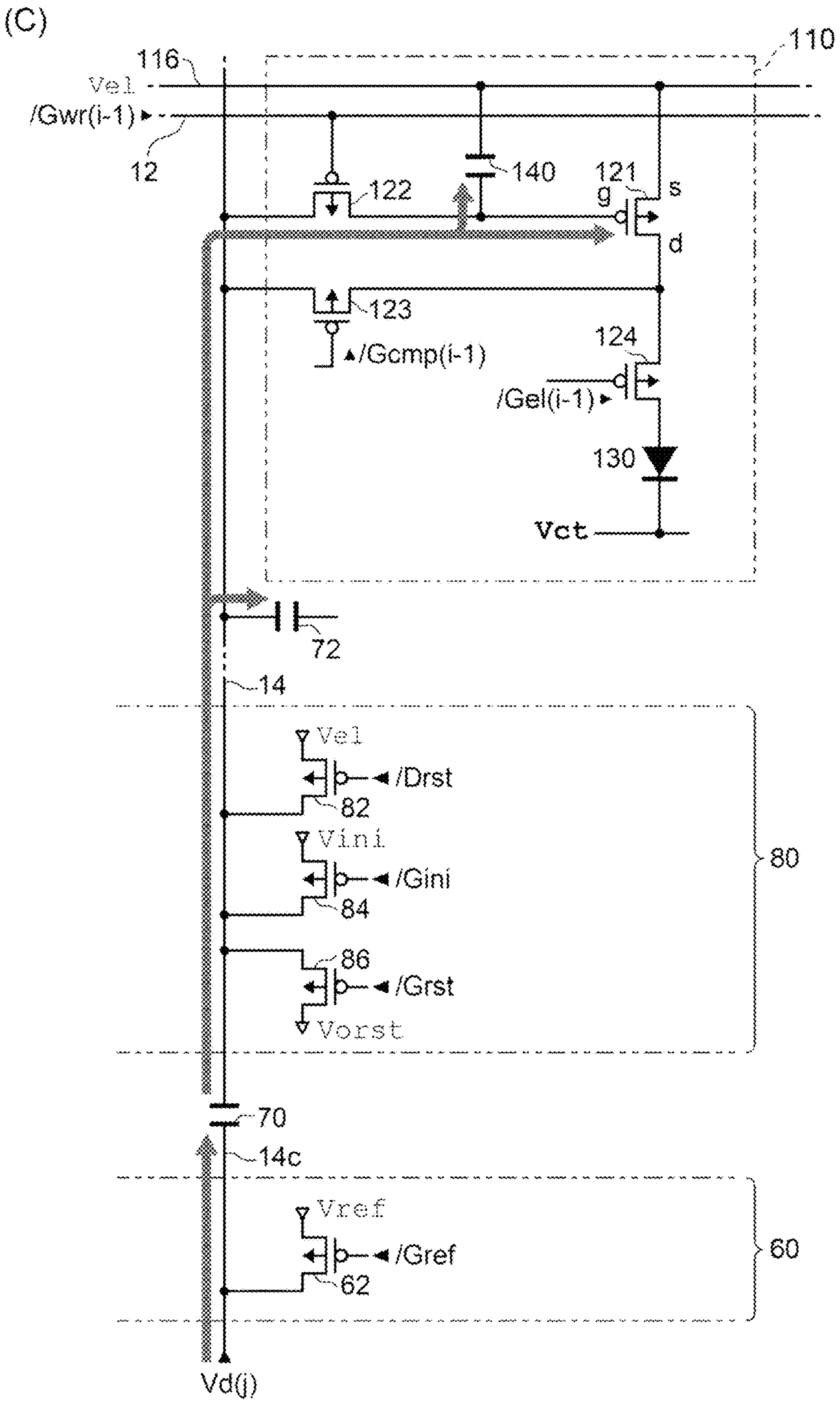
FIG. 11 is a diagram illustrating an operation of the electro-optical device.

Thus, as illustrated in FIG. 11, in the writing period (C), the potential at one end of the capacitive element 70 of the j-th column increases from the potential Vref to the potential of the gradation level corresponding to the (i−1)-th row and the j-th column. Such an increase in potential reaches the gate node g of the transistor 121 via the capacitive element 70, the data line 14, and the transistor 122 in order.

The amount of change in the potential of the gate node g in the writing period (C) is a value obtained by multiplying the amount of increase in potential at one end of the capacitive element 70 by a ratio of the capacitance value of the capacitive element 70 to a "combined capacitance value". Here, the "combined capacitance value" is a capacitance value of a combined capacitance of the capacitive element 70, the parasitic capacitance 72, and the capacitive element 140. The capacitance value of the capacitive element 140 is negligible when it is sufficiently smaller than the other capacitance values.

When the scanning signal /Gwr(i−1) changes to an H level, the writing period (D) of the (i−1)-th row ends, that is, the horizontal scanning period (H_odd) of the (i−1)-th row ends. When the scanning signal /Gwr(i−1) is set to be at an H level, the transistor 122 is set to be in an OFF state in the pixel circuit 110 of the (i−1)-th row and the j-th column, but a voltage of a difference between the potential of the gate node g and the potential Vel of the source node s is held in the capacitive element 140.

After the writing period (C) ends, the light emission period (D) starts.

When the light emission period (D) of the (i−1)-th row is reached, the control signal /Gel(i−1) is inverted to an L level, and thus the transistor 124 is set to be in an ON state.

Figure 12:
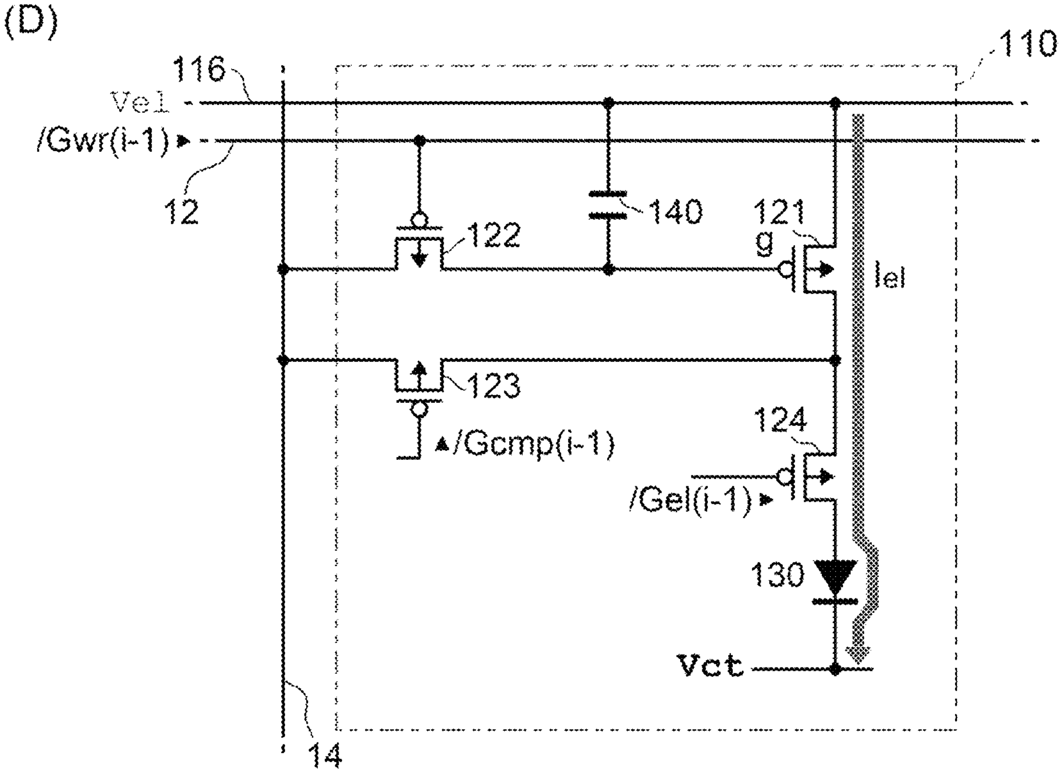
FIG. 12 is a diagram illustrating an operation of the electro-optical device.

Thus, as illustrated in FIG. 12, in the light emission period (D), a current Iel corresponding to the potential of the gate node g held by the capacitive element 140 flows through the OLED 130 in the pixel circuit 110 of the (i−1)-th row and the j-th column due to the transistor 121. For this reason, the OLED 130 emits light with a luminance corresponding to the current Iel.

In the odd-numbered frame (V_odd), an operation in the horizontal scanning period (H_even) of the even-numbered i-th row subsequent to the odd-numbered (i−1)-th row is the same as the operation in the horizontal scanning period (H_odd) of the odd-numbered (i−1)-th row except that the control signal /Grst is maintained at an H level in the initialization period (A2) as illustrated in FIG. 4.

Consequently, the operation in the horizontal scanning period (H_even) of the even-numbered i-th row will be described with emphasis on the initialization period (A2).

The initialization period (A2) of the horizontal scanning period (H_even) of the even-numbered i-th is the same as the initialization period (A2) of the horizontal scanning period (H_odd) of the odd-numbered (i−1)-th row in that the transistor 82 in each column changes to an OFF state, the transistor 84 in each column is maintained in an OFF state, and the transistor 62 in each column changes is maintained in an OFF state. The initialization period (A2) of the horizontal scanning period (H_even) corresponds to a "second initialization period" in the claims.

It should be noted that the control signal /Grst is maintained at an H level in the initialization period (A2) of the horizontal scanning period (H_even) of the even-numbered i-th row, and thus the transistor 86 in each column is maintained in an OFF state.

In the immediately preceding initialization period (A1), the data line 14 is set to the potential Vel, and the potential Vel is held at the other end of the capacitive element 70 and one end of the parasitic capacitance 72.

Further, in the initialization period (A2) of the horizontal scanning period (H_even), the transistor 122 in the pixel circuit 110 of the i-th row and j-th column changes to an OFF state, the transistor 123 changes to an ON state, and the transistor 124 changes to an ON state. The initialization period (A1) of the horizontal scanning period (H_even) corresponds to a "second gate node initialization period" in the claims.

Figure 8:
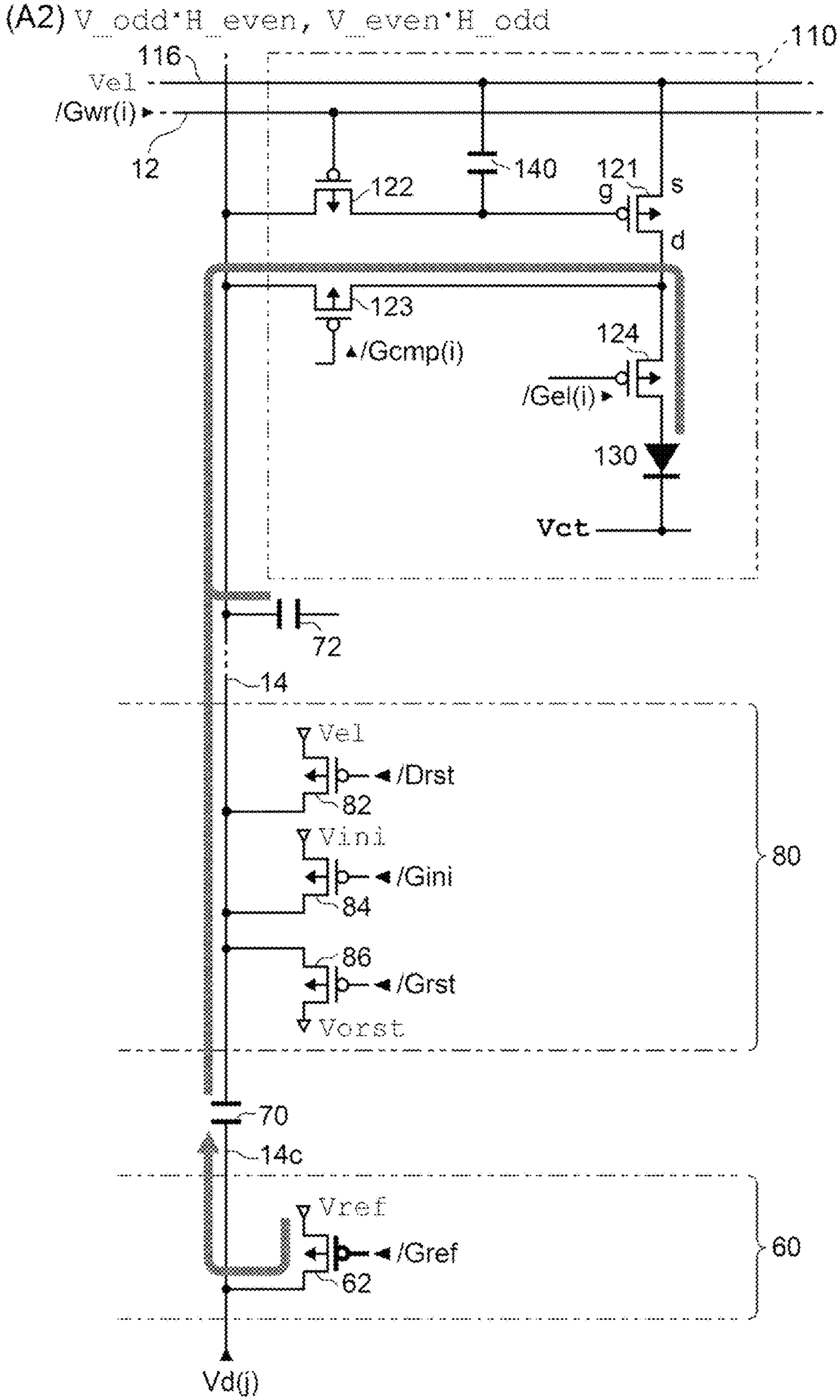
FIG. 8 is a diagram illustrating an operation of the electro-optical device.

For this reason, in the OLED 130 in the pixel circuit 110 of the i-th row and the j-th column, as illustrated in FIG. 8, an operation in which electric charge flows out from the capacitive element 70 and the parasitic capacitance 72, and move toward the OLED 130 via the data line 14 and the transistors 123 and 124 in order, that is, a non-reset operation, is performed. The non-reset operation corresponds to a "second operation" in the claims.

When the parasitic capacitance of the OLED 130 is fully charged by the electric charges flowing out from the capacitive element 70 and the parasitic capacitance 72, the electric charges overflow and flow to (the light emitting functional layer 132 of) the OLED 130, and thus the OLED 130 emits light.

In addition, since the capacitive element 70 and the parasitic capacitance 72 of the j-th column are discharged due to the outflow of the electric charges, the potential of the data line 14 decreases from the potential Vel. The amount of discharge is very small because the electric charges are distributed to the parasitic capacitance of the OLED 130 via the data line 14 of the j-th column.

For this reason, in the initialization period (A2) of the horizontal scanning period of the i-th row, the potentials of the data line 14 of the j-th column and the anode in the pixel circuit 110 of the i-th row and the j-th column are slightly lowered from the potential Vel to a potential between the potential Vorst and the potential Vel, but it may be said that the potential is substantially the potential Vel.

In this manner, in the odd-numbered frame (V_odd), in the initialization period (A2) of the horizontal scanning period (H_odd) of the odd-numbered (i−1)-th row, a reset operation for discharging the anode of the OLED 130 is performed, and in the initialization period (A2) of the horizontal scanning period (H_even) of the even-numbered i-th row, a non-reset operation is set and a reset operation is not performed.

The reason why the reset operation for discharging the anode of the OLED 130 is performed is mainly as follows. In the OLED 130, since the light emitting functional layer 132 is interposed between the pixel electrode 131 which is an anode and the common electrode 133 which is a cathode, capacitance is parasitic in the OLED 130. As described above, in the compensation period (B), the gate node g and the drain node d of the transistor 121 (the source node of the transistor 124) are set to a threshold equivalent potential. Next, in the writing period (C), a potential corresponding to the gradation level is supplied to the gate node g of the transistor 121.

If a data signal corresponding to a black level of the lowest gradation (darkest level) is supplied to the gate node g, the gate node g is ideally set to the potential Vel, but in reality, the gate node g is set to a potential lower than the potential Vel. For this reason, when the transistor 124 is set to be in an ON state in the light emission period (D), a leakage current flows from the source node s to the drain node d in the transistor 121. When electric charges accumulated in the parasitic capacitance of the OLED 130 are not reset in advance, a phenomenon occurs in which the parasitic capacitance is fully charged due to the leakage current, a current starts to flow through the OLED 130, and light is emitted. This phenomenon is referred to as “black floating” because although a black level is designated, that is, luminance at which light is not emitted is designated, light is slightly emitted and black is visually recognized as if floating.

Consequently, in the initialization period (A2), the potential of the anode of the OLED 130 is set to the potential Vorst to discharge the anode in advance, thereby resetting the electric charges accumulated in the parasitic capacitance of the OLED 130. Thereby, even when a leakage current flows through the transistor 121 in the light emission period (D), the parasitic capacitance of the OLED 130 is not fully charged by the leakage current, and light is not emitted, thereby making it possible to suppress so-called black floating.

However, the configuration in which the reset operation is performed may cause a hindrance to low power consumption. When the reset operation is performed, the other end of the capacitive element 70 and one end of the parasitic capacitance 72 are set to the potential Vel in the initialization period (A1), set to the potential Vorst in the initialization period (A2), and set to the potential Vini in the initialization period (A3).

As described above the potentials Vel, Vorst, and Vini have a relationship satisfying Vel>Vini>Vorst (≒Vct).

Among these, the potential Vel is a high potential of a power supply voltage, and the potential Vorst is a low potential Gnd of the power supply voltage or a potential close to the potential Gnd. For this reason, when the reset operation is performed, the capacitive element 70 and the parasitic capacitance 72 are charged in the initialization period (A1), discharged in the initialization period (A2), and charged in the initialization period (A3). Since such charging→discharging→charging in the capacitive element 70 and the parasitic capacitance 72 is performed in each column, power consumption increases. The initialization period (A3) after the initialization period (A2) of the horizontal scanning period (H_even) corresponds to a “fourth initialization period” in the claims.

The non-reset operation is the same as the reset operation in that the other end of the capacitive element 70 and one end of the parasitic capacitance 72 are charged to the potential Vel in the initialization period (A1). However, in the non-reset operation, an operation of distributing electric charges is performed in the initialization period (A2), and thus discharge of the capacitive element 70 and the parasitic capacitance 72 is negligible as compared with a case where the reset operation is performed. Further, in the reset operation and the non-reset operation, both the other end of the capacitive element 70 and one end of the parasitic capacitance 72 are set to the potential Vini in the initialization period (A3). However, in the reset operation, charging is performed from the potential Vorst, whereas in the non-reset operation, discharging is performed from the potential Vel.

That is, in the initialization period (A1)→the initialization period (A2)→the initialization period (A3), the capacitive element 70 and the parasitic capacitance 72 are charged→discharged→charged in the reset operation, whereas they are charged→almost unchanged→discharged in the non-reset operation.

Thus, in the non-reset operation, power consumed by charging and discharging of the capacitive element 70 and the parasitic capacitance 72 in each column can be reduced as compared with the reset operation.

However, it should be noted that so-called black floating occurs in the non-reset operation, as described above. That is, in the odd-numbered frame (V_odd), the reset operation is performed in the horizontal scanning period (H_odd) of the odd-numbered (i−1)-th row, whereas the non-reset operation is performed in the horizontal scanning period (H_even) of the even-numbered i-th row, and thus black floating occurs.

Consequently, the embodiment adopts a configuration in which, in the even-numbered frame (V_even) subsequent to the odd-numbered frame (V_odd), a row for performing a reset operation and a row for forming a non-reset operation are switched by performing the non-reset operation in the horizontal scanning period (H_odd) of the odd-numbered (i−1)-th row and performing the reset operation in the horizontal scanning period (H_even) of the even-numbered i-th row.

In detail, as illustrated in FIG. 5, in the even-numbered frame (V_even), the control signal /Grst is set to be at an H level in the initialization period (A2) of the horizontal scanning period (H_odd) and set to be at an L level in the initialization period (A2) of the horizontal scanning period (H_even). The other control signals /Drst, /Gini, and /Gref are common to the horizontal scanning periods in the odd-numbered frames (V_odd).

For this reason, in the even-numbered frame (V_even), a non-reset operation is performed in the odd-numbered (i−1)-th row, and a reset operation is performed in the even-numbered i-th row.

In order to describe superiority of low power consumption and a reduction in display quality in the present embodiment, a comparative example will be described. The comparative example has a configuration in which a reset operation is performed in the initialization period (A2) without distinguishing between odd-numbered rows and even-numbered rows.

Figure 13:
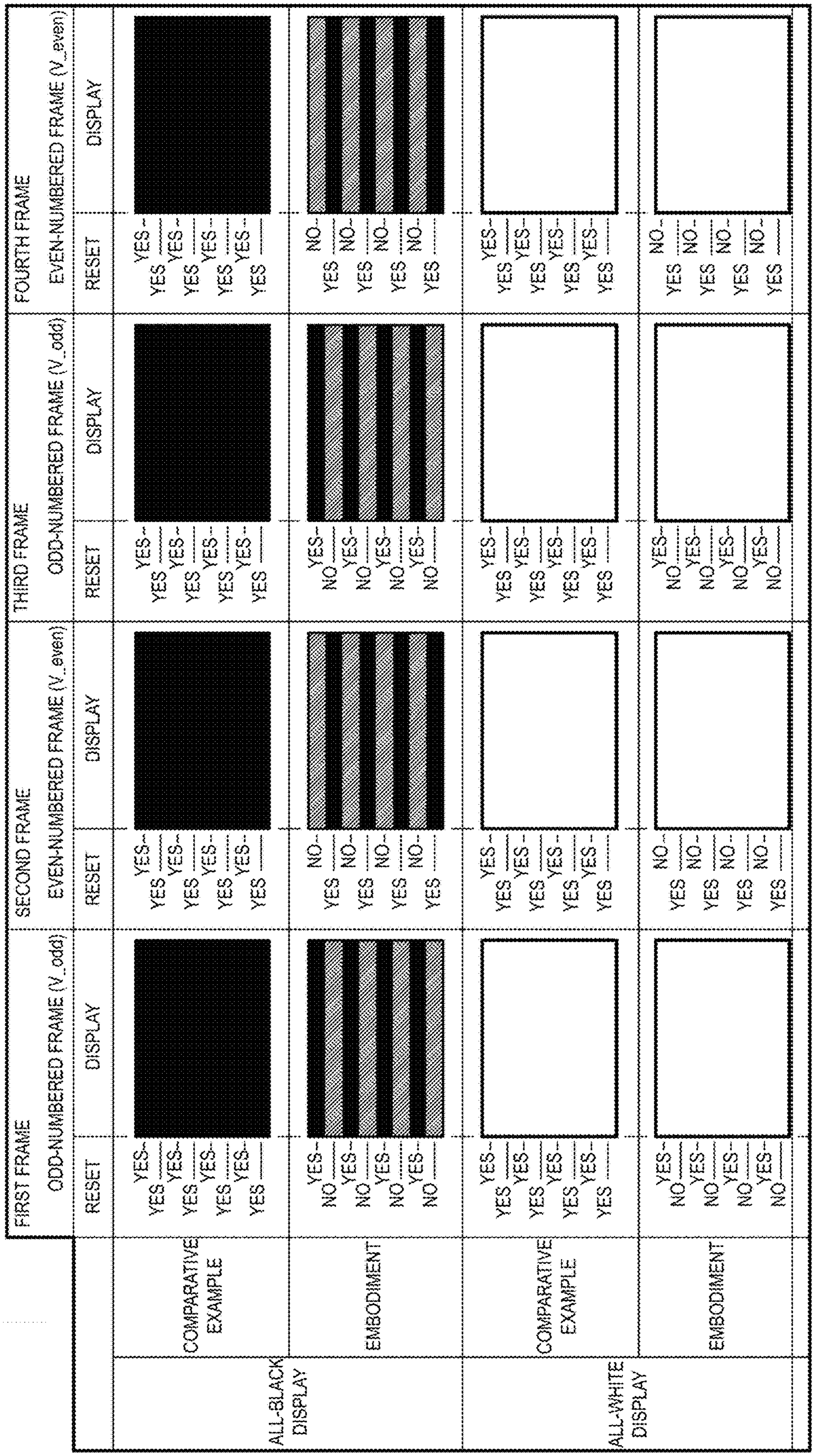
FIG. 13 is a diagram for describing superiority of the electro-optical device.

FIG. 13 is a diagram illustrating the case of all-black display when a black level of the lowest gradation is designated and the case of all-white display when a white level of the highest gradation is designated in four consecutive frames for all pixels in the comparative example and the embodiment. In the drawing, the four frames are a first frame, a second frame, a third frame, and a fourth frame in the order of time. Among the four frames, the first frame and the third frame are odd-numbered frames (V_odd), and the second frame and the fourth frame are even-numbered frames (V_even).

In the comparative example, in the case of all-black display, a reset operation is performed in all rows (reset: YES), and thus black floating does not occur. However, power is consumed by the capacitive element 70 and the parasitic capacitance 72 due to the reset operation.

On the other hand, in the embodiment, in the case of all-black display, a reset operation is performed in odd-numbered rows and a non-reset operation is performed in even-numbered rows (reset: NO) in the odd-numbered frames (V_odd). For this reason, black floating does not occur in the odd-numbered rows, but black floating occurs in the even-numbered rows. The black floating is indicated as a hatched region in FIG. 13.

In the embodiment, in the case of all-black display, a non-reset operation is performed in odd-numbered rows and a reset operation is performed in even-numbered rows in the even-numbered frames (V_even). For this reason, black floating occurs in the odd-numbered rows, but black floating does not occur in the even-numbered rows.

In the embodiment, the black floating occurs for each row in one frame, and thus a difference occurs between the odd-numbered row and the even-numbered row. However, the black floating alternately occurs in the odd-numbered frame (V_odd) and the even-numbered frame (V_even), and thus there is no difference between the odd-numbered row and the even-numbered row throughout two frame periods, thereby making it difficult to be visually recognized as black floating.

In the embodiment, a non-reset operation is performed in half of all rows in one frame, power consumed by the capacitive element 70 and the parasitic capacitance 72 can be suppressed as compared with the comparative example.

In the case of all-white display, a reset operation is performed in all rows in the comparative example, and thus there is no adverse effect caused by black floating.

On the other hand, in the embodiment, in the case of all-white display, a reset operation is not performed in any one of the odd-numbered rows and the even-numbered rows. Black floating occurs in a row in which a reset operation is not performed, but even when light is emitted with a slightly low luminance in a state in which light is emitted with a high luminance originally, the difference cannot be visually recognized.

Thus, in the case of all-white display, there is no difference in display between the comparative example and the embodiment. However, in the embodiment, a reset operation is not performed in half of all rows, and thus it is possible to suppress power consumed by the capacitive element 70 and the parasitic capacitance 72.

In the embodiment described above, various modifications or applications can be made as follows.

The embodiment adopts a configuration in which a horizontal scanning period is divided into odd-numbered rows and even-numbered rows on a row-by-row basis, but is not limited to this configuration. For example, a horizontal scanning period may be divided into two or more continuous rows.

In the embodiment and the like, the OLED 130 is described as an example of the light emitting element, but other light emitting elements may be used. For example, an LED may be used as the light emitting element, or a liquid crystal element combined with an illumination mechanism may be used. That is, the light emitting element may be an electro-optical element which enters an optical state according to the voltage of the data line 14.

In the embodiment and the like, a 10-bit conversion example is described as the DA conversion circuit 500, but the present disclosure is not limited thereto.

The channel type of the transistors 64, 82, 84, 86, 121 to 124, and the like is not limited to the embodiment and the like. In addition, the channel of these transistors and the like may be appropriately changed, or may be appropriately replaced with a transmission gate.

Next, an electronic apparatus to which the electro-optical device 10 according to the above-described embodiment and the like is applied is described. The electro-optical device 10 is suitable for application with a small pixel and high definition display. Consequently, a head-mounted display is described as an example of the electronic apparatus.

Figure 14:
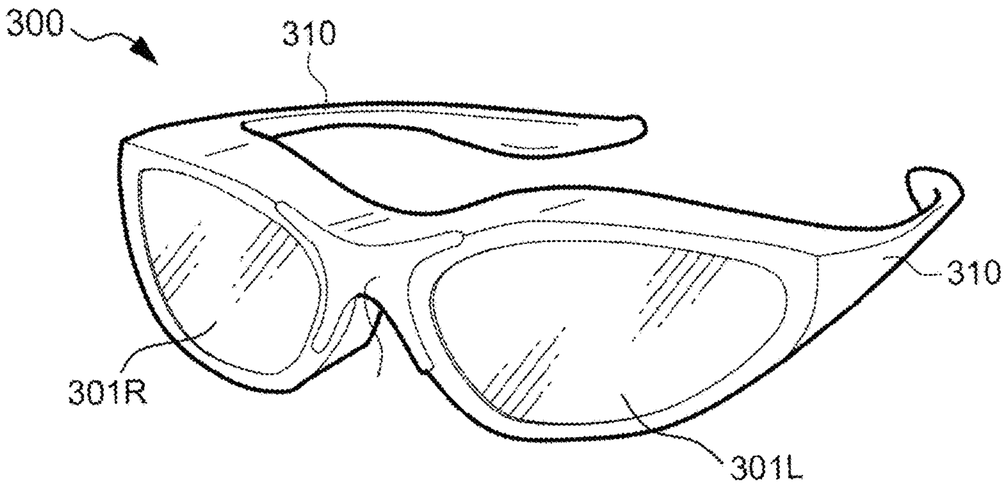
FIG. 14 is a perspective view illustrating a head-mounted display using the electro-optical device.
Figure 15:
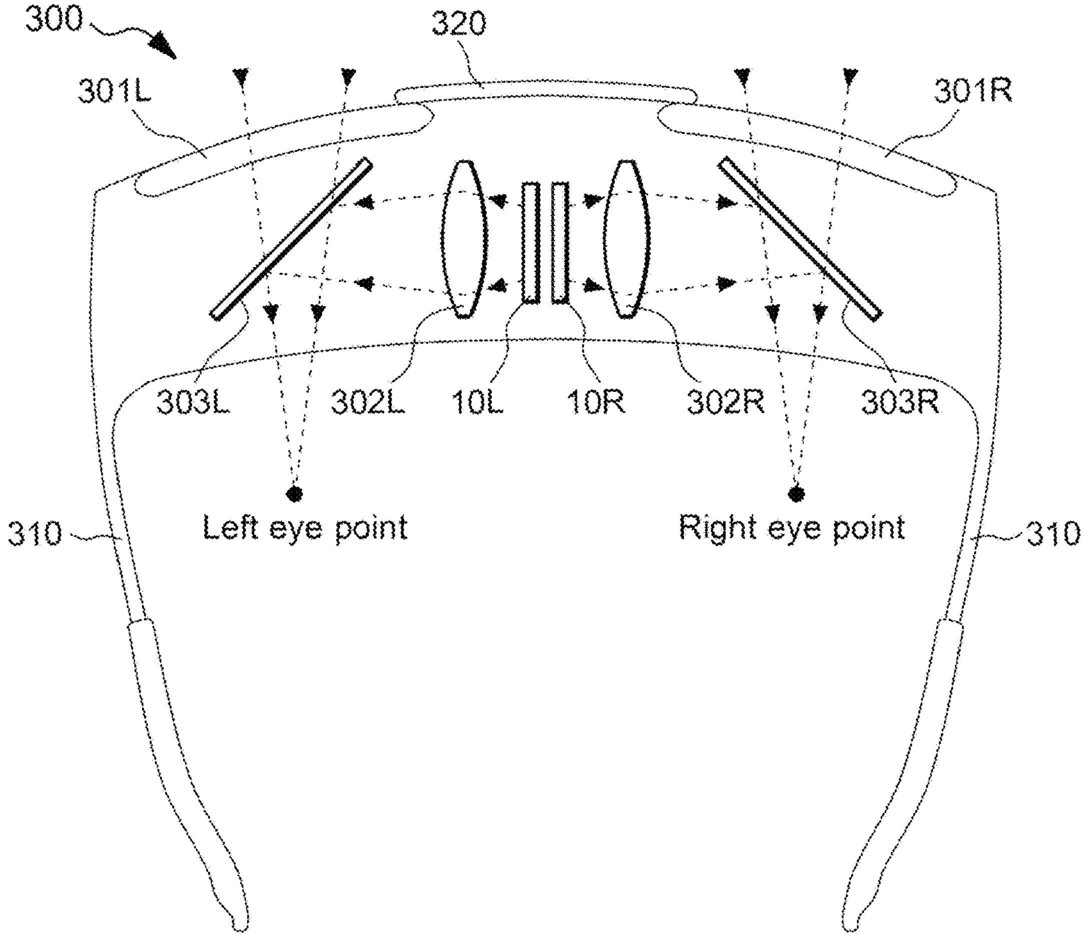
FIG. 15 is a diagram illustrating an optical configuration of the head-mounted display.

FIG. 14 is a diagram illustrating appearance of a head-mounted display, and FIG. 15 is a diagram illustrating an optical configuration thereof.

First, as illustrated in FIG. 14, a head-mounted display 300 includes, in terms of appearance, temples 310, a bridge 320, and lenses 301L and 301R, similar to typical eye glasses. In addition, as illustrated in FIG. 15, in the head-mounted display 300, an electro-optical device 10L for a left eye and an electro-optical device 10R for a right eye are provided in the vicinity of the bridge 320 and on the back side (the lower side in the drawing) of the lenses 301L and 301R.

An image display surface of the electro-optical device 10L is disposed to be on the left side in FIG. 15. Thus, a display image by the electro-optical device 10L is output via an optical lens 302L in a 9-o'clock direction in the drawing. A half mirror 303L reflects the display image by the electro-optical device 10L in a 6-o'clock direction, while the half mirror 303L transmits light incident in a 12-o'clock direction. An image display surface of the electro-optical device 10R is disposed on the right side opposite to the electro-optical device 10L. Thereby, the display image by the electro-optical device 10R is output via the optical lens 302R in a 3-o'clock direction in the drawing. A half mirror 303R reflects the display image by the electro-optical device 10R in a 6-o'clock direction, while the half the mirror 303R transmits light incident in a 12-o'clock direction.

In this configuration, a wearer of the head-mounted display 300 can observe the display images by the electro-optical devices 10L and 10R in a see-through state in which the display image by the electro-optical devices 10L and 10R overlaps the outside.

Further, in the head-mounted display 300, in the images for both eyes with parallax, an image for the left eye is displayed on the electro-optical device 10L, and an image for the right eye is displayed on the electro-optical device 10R, and thus, it is possible to cause the wearer to sense the displayed images as an image having a depth or a three-dimensional effect.

In addition to the head-mounted display 300, the electronic apparatus including the electro-optical device 10 can be applied to an electronic viewing finder in a video camera, a lens-exchangeable digital camera, or the like, a mobile information terminal, a wristwatch display, a light valve for a projection type projector, and the like.

For example, the following aspects are understood from the embodiments exemplified above.

An electro-optical device according to an aspect (aspect 1) includes a first pixel circuit that is provided corresponding to a data line and a first scanning line, a second pixel circuit that is provided corresponding to the data line and a second scanning line, and a control circuit that controls the first pixel circuit and the second pixel circuit, in which the first pixel circuit includes a first light emitting element that emits light with a luminance corresponding to a current flowing between two electrodes, and a first drive transistor that causes a current corresponding to a voltage between a potential of a gate node and a potential of a source node to flow to the first light emitting element, the second pixel circuit includes a second light emitting element that emits light with a luminance corresponding to a current flowing between two electrodes, and a second drive transistor that causes a current corresponding to a voltage between the potential of the gate node and the potential of the source node to flow to the second light emitting element, the control circuit, during a first horizontal scanning period in which the first scanning line is selected in a first frame, supplies a potential corresponding to a gradation level to a gate node of the first drive transistor via the data line in a first writing period, and executes a first operation in a first initialization period before the first writing period, the control circuit, during a second horizontal scanning period in which the second scanning line is selected, supplies a potential corresponding to a gradation level to a gate node of the second drive transistor via the data line in a second writing period, and executes a second operation in a second initialization period before the second writing period, the first operation is an operation of supplying a first potential to one of the two electrodes via the data line, the first potential being different from a potential corresponding to the gradation level, the second operation is an operation of setting a potential of the data line and a potential of the one electrode to a potential between the first potential and the second potential, and the second potential is a potential for setting the first drive transistor and the second transistor to be in an OFF state when the second potential is supplied to the gate node.

According to aspect 1, when the first operation is executed in the first pixel circuit, the second operation is executed in the second pixel circuit. While a discharge amount in a parasitic capacitance of the data line increases in the first operation, a discharge amount in a parasitic capacitance of the data line is suppressed in the second operation.

The odd-numbered frame (V_odd) is an example of the first frame, the scanning line 12 of the (i−1)-th row is an example of the first scanning line, and the scanning line 12 of the i-th row is an example of the second scanning line. The pixel circuit 110 in the (i−1)-th row and the j-th column is an example of the first pixel circuit, and the pixel circuit 110 in the i-th row and the j-th column is an example of the second pixel circuit.

The OLED 130 is an example of the light emitting element, the pixel electrode 131 is an example of one of the two electrodes, the transistor 121 is an example of the drive transistor, the potential Vorst is an example of the first potential, and the potential Vel is an example of the second potential which is an off-potential. A potential slightly lower than the potential Vel, specifically, a potential after electrical charges accumulated in the parasitic capacitance of the data line held at an OFF potential in the first initialization period are distributed to one electrode inf the light emitting element in an OFF state is an example of a potential between the first potential and the second potential.

In addition, the horizontal scanning period (H_odd) is an example of the first horizontal scanning period, and the horizontal scanning period (H_even) is an example of the second horizontal scanning period.

The electro-optical device according to a specific aspect 2 of aspect 1 further includes a first switching element that includes one end and the other end, the one end being electrically coupled to the data line, and the other end being electrically coupled to a power supply line of the first potential, in which the control circuit control the first switching element to be in an ON state in the first initialization period.

According to aspect 2, the data line is set to the first potential due to the first switching element being set to be in an ON state in the first initialization period.

The transistor 86 is an example of the first switching element.

The electro-optical device according to a specific aspect 3 of aspect 2 further includes a second switching element that includes one end and the other end, the one end being electrically coupled to the data line, and the other end being electrically coupled to a power supply line for supplying an on-potential, in which the control circuit controls the second switching element to be in an ON state in a third initialization period after the first initialization period and before the first writing period, and in a fourth initialization period after the second initialization period and before the second writing period, and the on-potential is a potential for setting the first drive transistor and the second drive transistor to be in an ON state when the on-potential is supplied to the gate node.

According to aspect 3, a potential of the data line and a potential in the gate node are set to an on-potential due to the second switching element being in an ON state in the third initialization period and the fourth initialization period. The transistor 84 is an example of the second switching element.

In the electro-optical device according to a specific aspect 4 of aspect 3, the control circuit supplies the on-potential to the gate node via the data line in the third initialization period and the fourth initialization period, and the control circuit converges a gate node of the first drive transistor and a gate node of the second drive transistor on a potential equivalent to threshold values of the first drive transistor and the second drive transistor in a first compensation period after the third initialization period and before the first writing period, and in a second compensation period after the fourth initialization period and before the second writing period.

In order to cause the gate node to converge on the potential equivalent to the threshold value of the first (second) drive transistor in the first (second) compensation period, it is necessary to cause the first (second) drive transistor to be in an ON state before the first (second) compensation period. According to aspect 4, the data line in the first operation changes from a second potential to a first potential and then changes to an on-potential, and thus power is consumed by the parasitic capacitance of the data line, whereas the data line in the second operation changes from the second potential to the on-potential, and thus power consumed by the parasitic capacitance of the data line is suppressed as compared with the first operation.

In the electro-optical device according to another specific aspect 5 of aspect 1, the control circuit executes the second operation in the first initialization period and executes the first operation in the second initialization period in a second frame following the first frame.

According to aspect 5, a scanning line on which the first operation is performed and a scanning line on which the second operation is performed are replaced and leveled from the first frame in the second frame, and thus it is possible to make deterioration of display quality due to the second operation inconspicuous.

The even-numbered frame (V_even) is an example of the second frame.

In the electro-optical device according to another specific aspect 6 of aspect 1, the control circuit supplies the potential corresponding to the gradation level to the gate node via a coupling capacitance and the data line in the first writing period and the second writing period.

According to aspect 6, it is possible to suppress not only the parasitic capacitance of the data line but also a discharge amount of a coupling capacitance. The capacitive element 70 is an example of the coupling capacitance.

In another specific aspect 7 of aspect 1, the control circuit supplies the second potential to the gate node of the first drive transistor via the data line in a first gate node initialization period before the first initialization period during the first horizontal scanning period, and the control circuit supplies the second potential to the gate node of the second drive transistor via the data line in a second gate node initialization period before the second initialization period during the second horizontal scanning period.

An electronic apparatus according to aspect 8 includes the electro-optical device according to any one of aspects 1 to 7.

What is claimed is:

1. An electro-optical device comprising:

a first pixel circuit that is provided corresponding to a data line and a first scanning line;

a second pixel circuit that is provided corresponding to the data line and a second scanning line; and a control circuit that controls the first pixel circuit and the second pixel circuit, wherein the first pixel circuit includes a first light emitting element that emits light with a luminance corresponding to a current flowing between two electrodes, and a first drive transistor that causes a current corresponding to a voltage between a potential of a gate node and a potential of a source node to flow to the first light emitting element, the second pixel circuit includes a second light emitting element that emits light with a luminance corresponding to a current flowing between two electrodes, and a second drive transistor that causes a current corresponding to a voltage between the potential of the gate node and the potential of the source node to flow to the second light emitting element, the control circuit, during a first horizontal scanning period in which the first scanning line is selected in a first frame, supplies a potential corresponding to a gradation level to a gate node of the first drive transistor via the data line in a first writing period, and executes a first operation in a first initialization period before the first writing period, the control circuit, during a second horizontal scanning period in which the second scanning line is selected, supplies a potential corresponding to a gradation level to a gate node of the second drive transistor via the data line in a second writing period, and executes a second operation in a second initialization period before the second writing period, the first operation is an operation of supplying a first potential to one of the two electrodes via the data line, the first potential being different from a potential corresponding to the gradation level, the second operation is an operation of setting a potential of the data line and a potential of the one electrode to a potential between the first potential and the second potential, and the second potential is a potential for setting the first drive transistor and the second drive transistor to be in an OFF state when the second potential is supplied to the gate node.

2. The electro-optical device according to claim 1, further comprising:

a first switching element that includes one end and the other end, the one end being electrically coupled to the data line, and the other end being electrically coupled to a power supply line of the first potential, wherein the control circuit performs control such that the first switching element is brought into an ON state in the first initialization period.

3. The electro-optical device according to claim 2, further comprising:

a second switching element that includes one end and the other end, the one end being electrically coupled to the data line, and the other end being electrically coupled to a power supply line for supplying an on-potential, wherein the control circuit controls the second switching element to be in an ON state in a third initialization period after the first initialization period and before the first writing period, and in a fourth initialization period after the second initialization period and before the second writing period, and the on-potential is a potential for setting the first drive transistor and the second drive transistor to be in an ON state when the on-potential is supplied to the gate node.

4. The electro-optical device according to claim 3, wherein the control circuit supplies the on-potential to the gate node via the data line in the third initialization period and the fourth initialization period, and the control circuit causes a potential of a gate node of the first drive transistor and a gate node of the second drive to converge to a potential equivalent to threshold values of the first drive transistor and the second drive transistor in a first compensation period after the third initialization period and before the first writing period, and in a second compensation period after the fourth initialization period and before the second writing period.

5. The electro-optical device according to claim 1, wherein the control circuit executes the second operation in the first initialization period and executes the first operation in the second initialization period in a second frame following the first frame.

6. The electro-optical device according to claim 1, wherein the control circuit supplies the potential corresponding to the gradation level to the gate node via a coupling capacitance and the data line in the first writing period and the second writing period.

7. The electro-optical device according to claim 1, wherein the control circuit supplies the second potential to the gate node of the first drive transistor via the data line in a first gate node initialization period before the first initialization period during the first horizontal scanning period, and the control circuit supplies the second potential to the gate node of the second drive transistor via the data line in a second gate node initialization period before the second initialization period during the second horizontal scanning period.

8. An electronic apparatus comprising the electro-optical device according to claim 1.

* * * * *